(12) United States Patent
Douglas et al.

(10) Patent No.: US 11,589,033 B1
(45) Date of Patent: Feb. 21, 2023

(54) IMMERSIVE VIEWING EXPERIENCE

(71) Applicants: Robert Edwin Douglas, Winter Park, FL (US); Kathleen Mary Douglas, Winter Park, FL (US); David Byron Douglas, Winter Park, FL (US)

(72) Inventors: Robert Edwin Douglas, Winter Park, FL (US); Kathleen Mary Douglas, Winter Park, FL (US); David Byron Douglas, Winter Park, FL (US)

( * ) Notice: Subject to any disclaimer, the term of this patent is extended or adjusted under 35 U.S.C. 154(b) by 0 days.

(21) Appl. No.: 17/237,152

(22) Filed: Apr. 22, 2021

Related U.S. Application Data

(63) Continuation-in-part of application No. 17/225,610, filed on Apr. 8, 2021, now Pat. No. 11,366,319, which is a continuation-in-part of application No. 17/187,828, filed on Feb. 28, 2021, now abandoned.

(51) Int. Cl.
| | |
|---|---|
| *H04N 13/366* | (2018.01) |
| *H04N 13/332* | (2018.01) |
| *H04N 5/232* | (2006.01) |
| *H04N 13/243* | (2018.01) |
| *H04N 13/296* | (2018.01) |
| *H04N 13/111* | (2018.01) |
| *H04N 13/302* | (2018.01) |
| *H04L 67/50* | (2022.01) |

(52) U.S. Cl.
CPC ......... *H04N 13/366* (2018.05); *H04L 67/535* (2022.05); *H04N 5/23212* (2013.01); *H04N 5/23232* (2013.01); *H04N 13/111* (2018.05); *H04N 13/243* (2018.05); *H04N 13/296* (2018.05); *H04N 13/302* (2018.05); *H04N 13/332* (2018.05)

(58) Field of Classification Search
CPC .. H04N 13/366; H04N 13/332; H04N 13/378; H04N 13/383; H04N 13/243; H04L 67/22; G06F 3/04815
See application file for complete search history.

(56) References Cited

U.S. PATENT DOCUMENTS

| | | | |
|---|---|---|---|
| 10,551,993 B1* | 2/2020 | Sanocki | G06F 3/017 |
| 11,206,364 B1* | 12/2021 | Price | G06T 5/50 |
| 2009/0219283 A1* | 9/2009 | Hendrickson | H04N 13/128 |
| | | | 345/473 |
| 2018/0165830 A1* | 6/2018 | Danieau | G06F 3/012 |
| 2019/0045125 A1* | 2/2019 | Järvenpää | G06T 7/33 |
| 2019/0088007 A1* | 3/2019 | Caputo | G06T 15/005 |
| 2019/0342632 A1* | 11/2019 | DeFaria | G06T 15/20 |
| 2020/0084432 A1* | 3/2020 | Ravirala | H04N 13/239 |
| 2020/0294209 A1* | 9/2020 | Pohl | G06T 5/005 |
| 2020/0371673 A1* | 11/2020 | Faulkner | G06F 3/017 |

* cited by examiner

*Primary Examiner* — Rowina J Cattungal

(57) ABSTRACT

This patent discloses a method record imagery in a way that is larger than a user could visualize. Then, allow the user to view naturally via head tracking and eye tracking to allow one to see and inspect a scene as if one were naturally there viewing it in real time. A smart system of analyzing the viewing parameters of a user and streaming of customized image to be displayed is also taught herein.

20 Claims, 24 Drawing Sheets

METHODS TO DETERMINE WHICH STEREO PAIR TO DISPLAY TO A USER FOR A GIVEN TIME POINT

Analysis of user
- Analyze the viewing direction of a user's head.
  - e.g., if user's head is in a forward direction, a first stereo pair could be used and if a user's head is in a direction toward the left a second stereo pair could be used
- Analyze the viewing angle of the user's gaze
  - e.g., if user is looking in a direction towards a distant object (e.g., mountain in the distance), then the distant (e.g., zone 3) stereo image pair would be selected for that time point.
- Analyze the convergence
  - e.g., if a viewing direction of a near object (e.g., leaf on a tree) is extremely similar to a viewing direction to a distant object (e.g., mountain in the distance), option to use combination of convergence and viewing angle.
- Analyze the accommodation of the user's eyes
  - e.g., monitor a user's pupil size and use change in size to indicate where (near / far) the user is looking.

STEREOSCOPIC CAMERA CLUSTERS

IMAGE PROCESSING OF THE RECORDED DATA

GENERATING A COMPOSITE IMAGE

USER A AND USER B SEE DIFFERENT IMAGES AT SAME TIME POINT WHILE WATCHING A MOVIE
Fig. 9A top down view
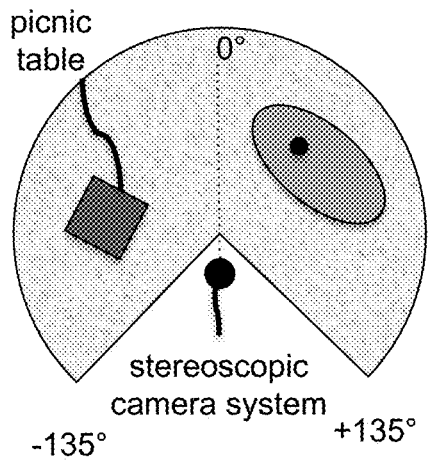
Fig. 9B images obtained from camera system
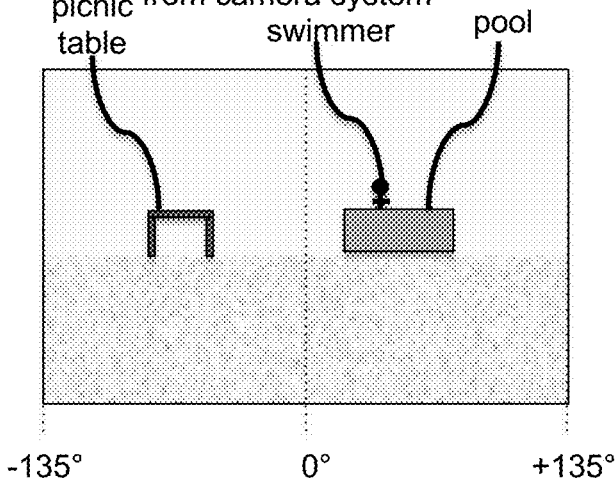
Fig. 9C User A's viewing angle at t=1
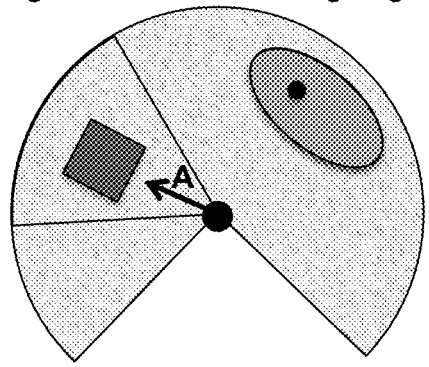
Fig. 9D User A's view at t=1
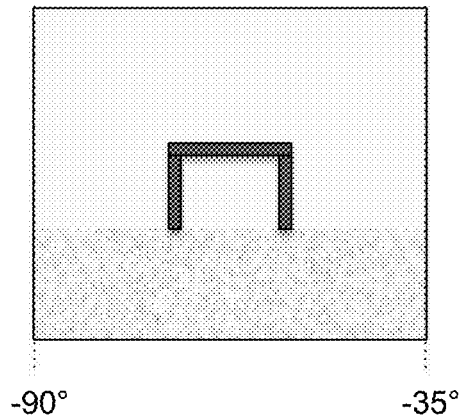
Fig. 9E User B's viewing angle at t=1
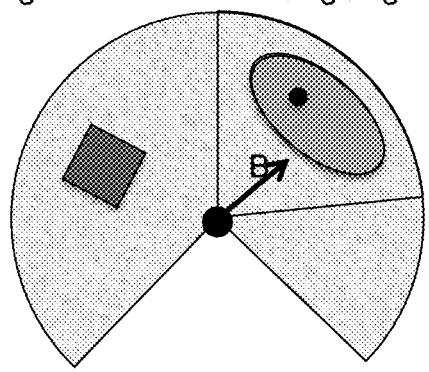
Fig. 9F User B's view at t=1
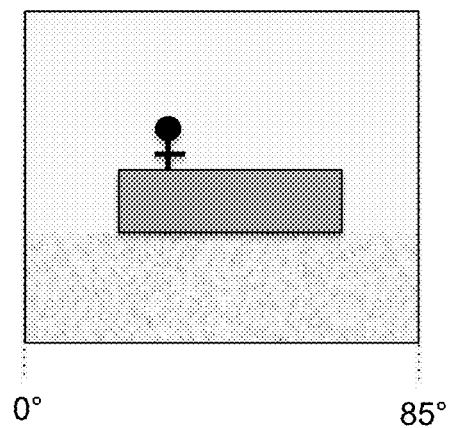

FOR AN ACQUIRED WIDE ANGLE STEREO IMAGE, VARIOUS
IMAGES CAN BE RECONSTRUCTED
Fig. 10A Left camera FOV
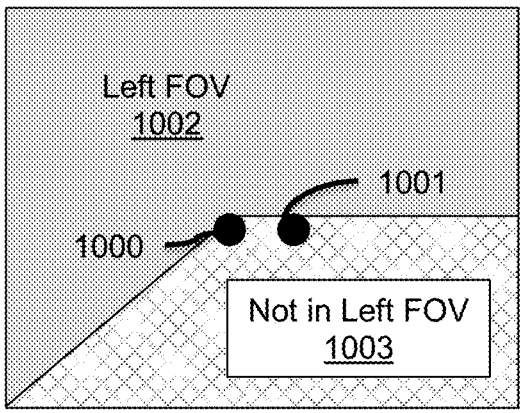
Fig. 10B Right camera FOV
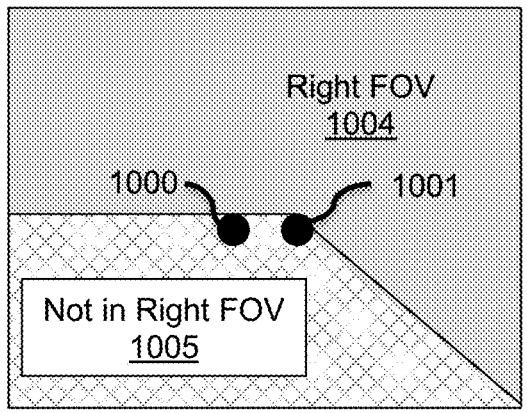
Fig. 10C First viewer's view
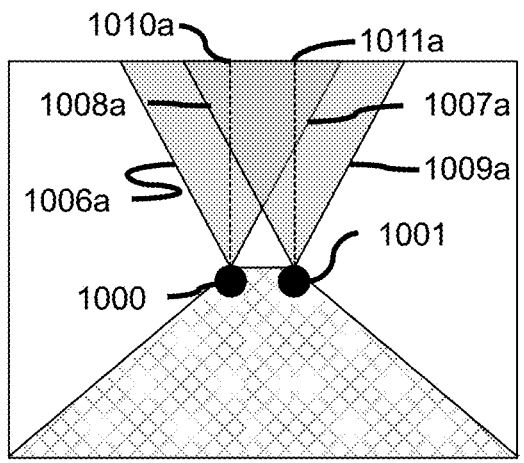
Fig. 10D Second viewer's view
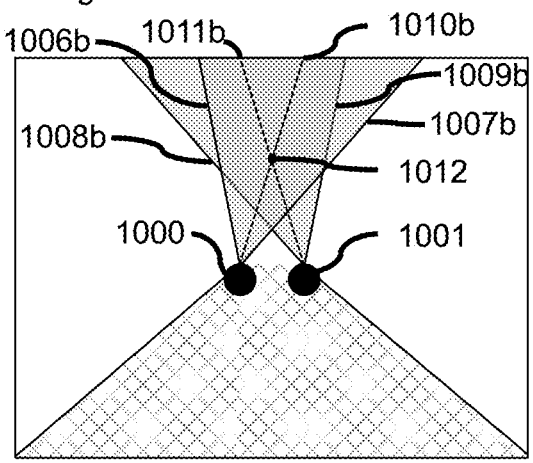
Fig. 10E Third viewer's view
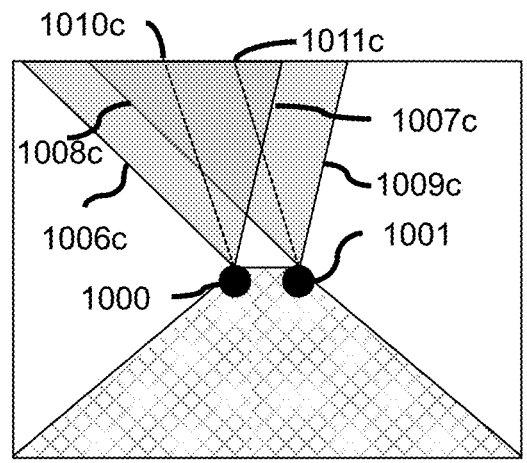
Fig. 10F Fourth viewer's view
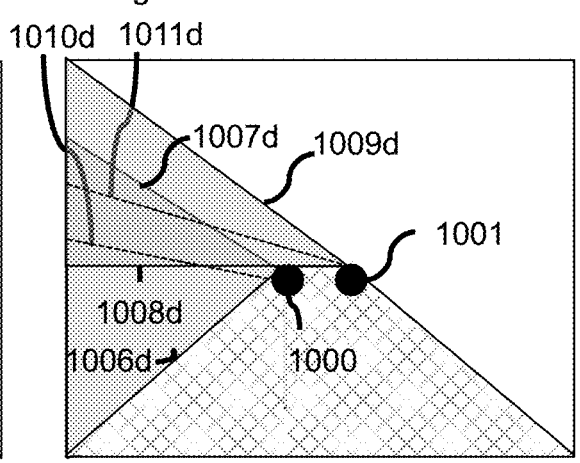

FOR AN ACQUIRED WIDE ANGLE STEREO IMAGE, VARIOUS IMAGES CAN BE RECONSTRUCTED
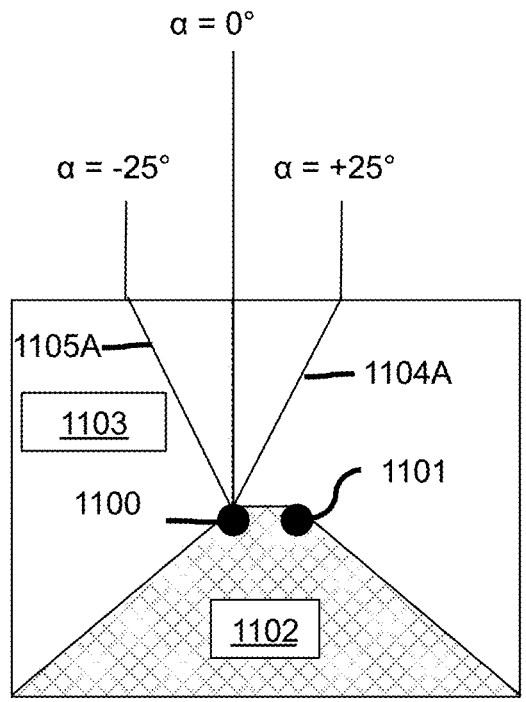
Fig. 11A Top down view of a left eye view, t = 1
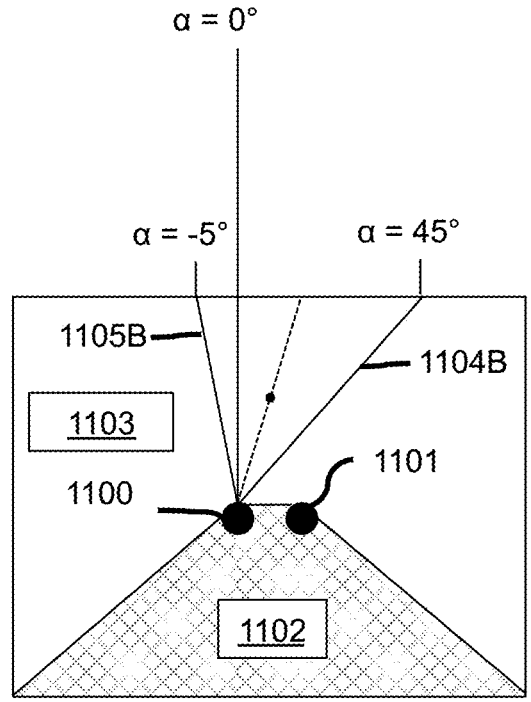
Fig. 11B Top down view a left eye view, t = 2
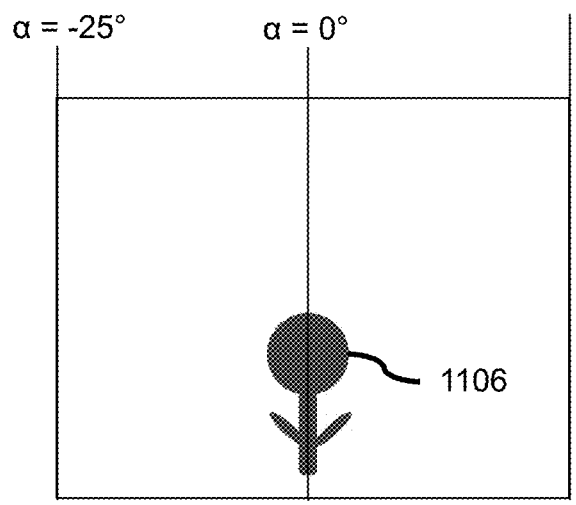
Fig. 11C Left eye view at t = 1
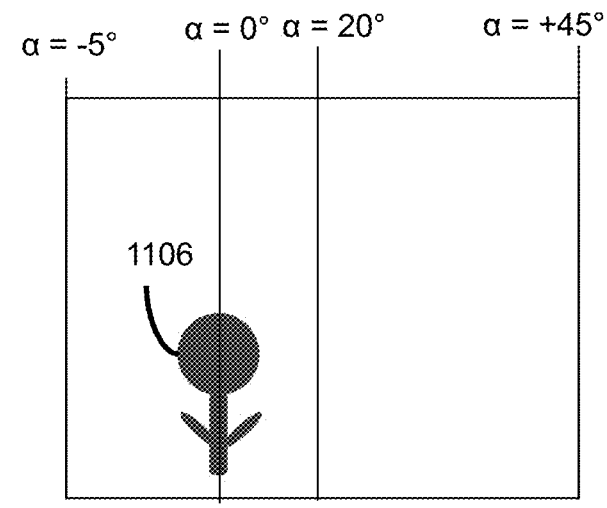
Fig. 11D Left eye view at t = 2

NEAR SPHERICAL VIEWING VIA A PROJECTOR
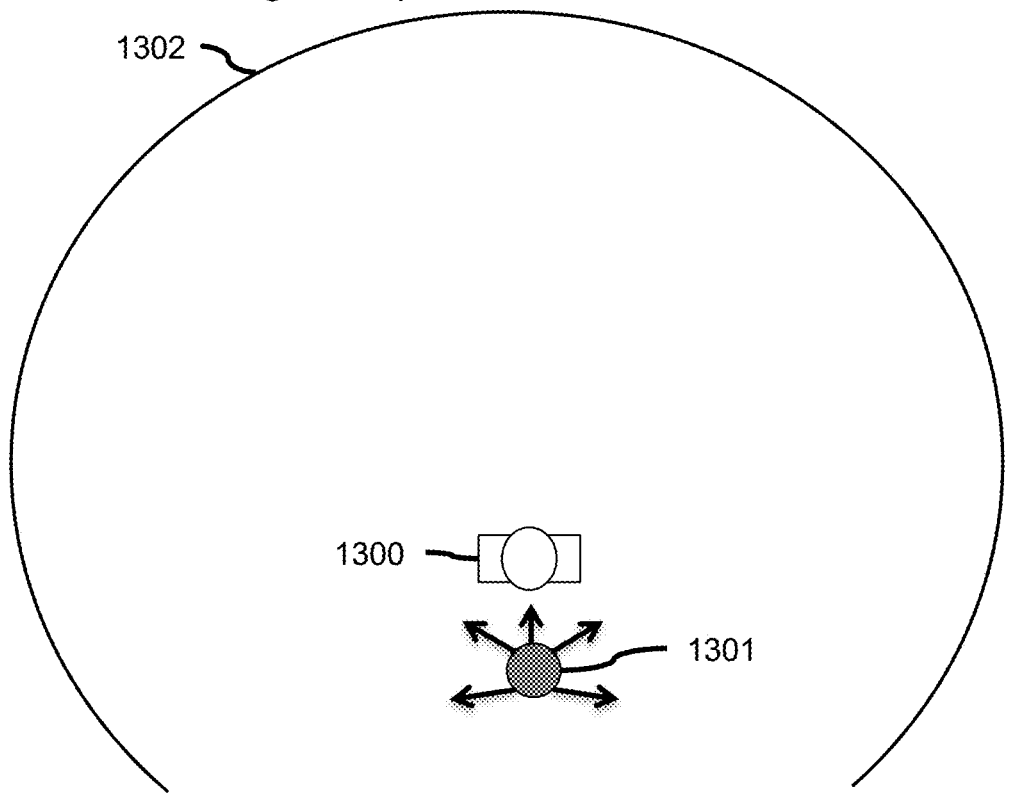
Fig. 13A Top Down View of Home Theater
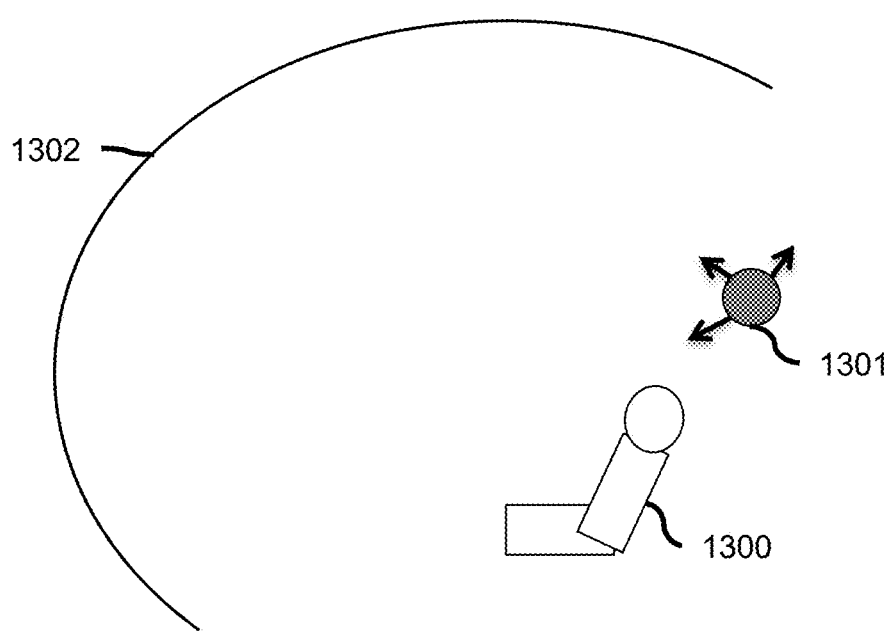
Fig. 13B Side View of Home Theater NEAR SPHERICAL VIEWING VIA A PROJECTOR
Fig. 14A Top Down View of Home Theater
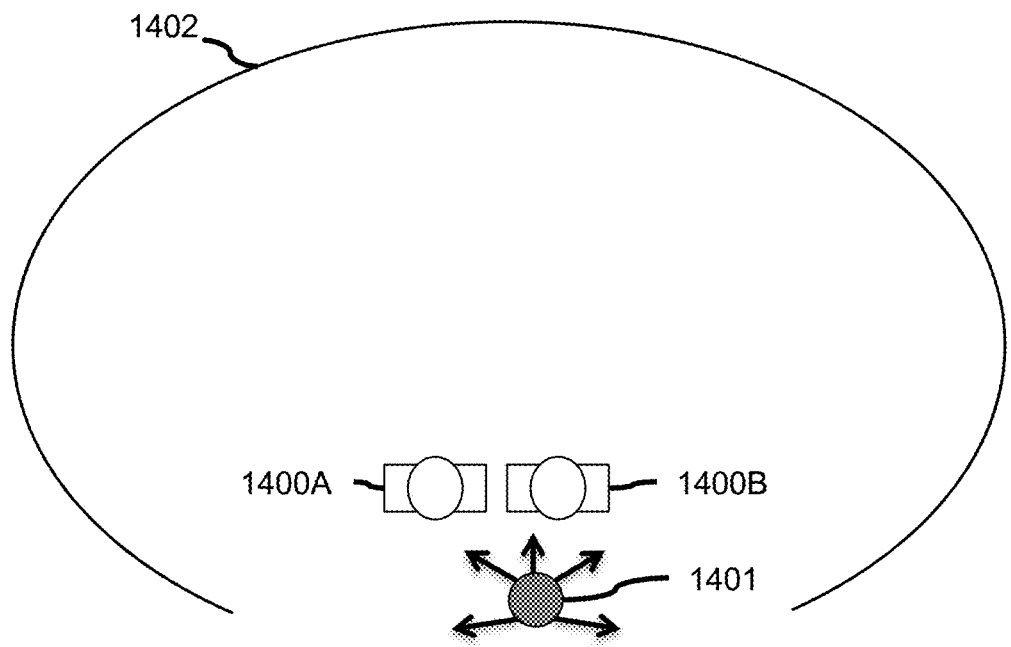
Fig. 14B Side View of Home Theater
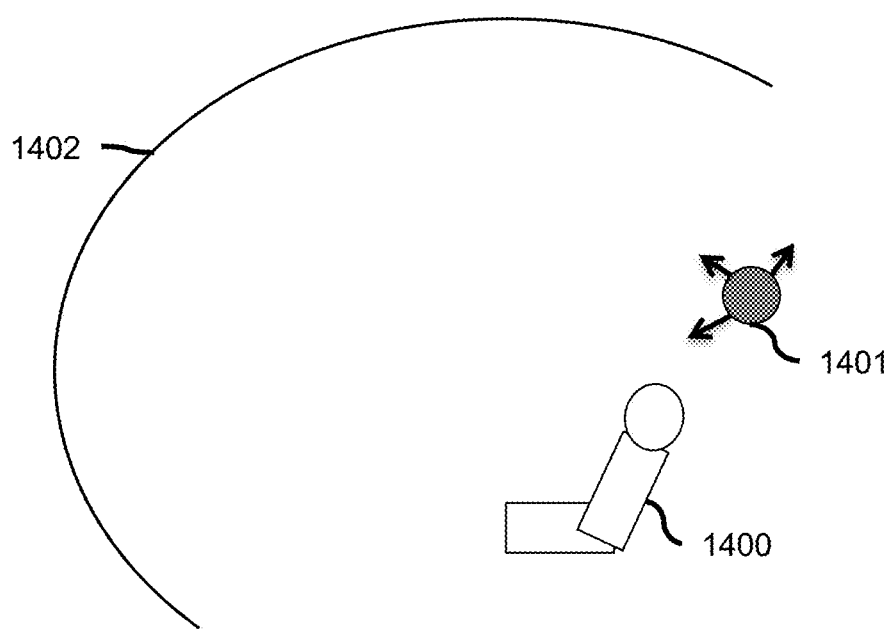

NEAR SPHERICAL VIEWING VIA A TV
Fig. 15A Top Down View of Home Theater, t = 1
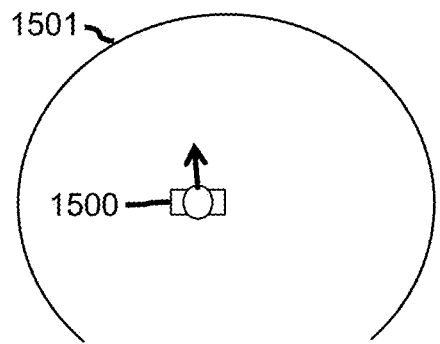
Fig. 15B Portion of the TV where user is viewing, t = 1
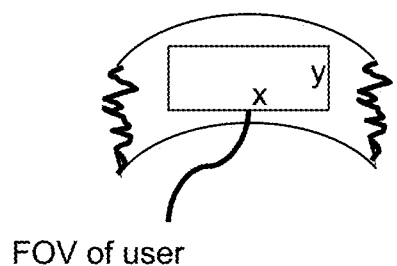
FOV of user
Fig. 15C Top Down View of Home Theater, t = 2
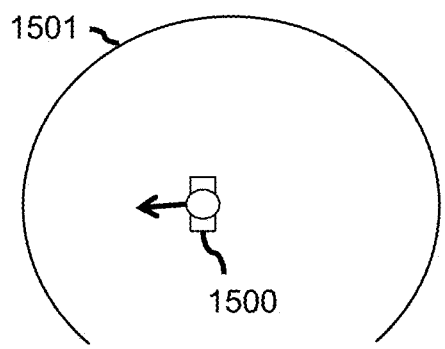
Fig. 15D Portion of the TV where user is viewing, t = 2
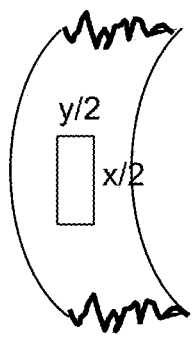
Fig. 15E Top Down View of Home Theater, t =
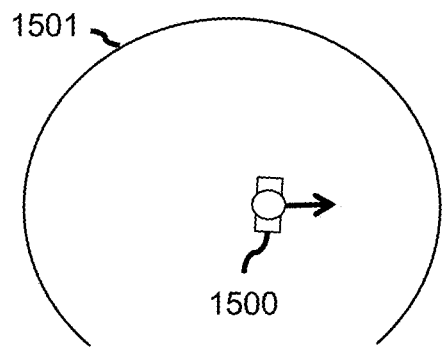
Fig. 15F Portion of the TV where user is viewing, t = 2
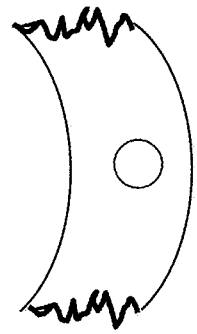

DIGITAL-TYPE ZOOMING IN ON A PORTION OF AN IMAGE

OPTICAL-TYPE ZOOMING IN ON A PORTION OF AN IMAGE

A MULTI-RESOLUTION IMAGE

A MULTI-RESOLUTION IMAGE FOR MULTIPLE USERS

VIEWING-PARAMETER DIRECTED STREAMING

NEAR-REAL-TIME STREAMING OF CUSTOMIZED IMAGES

USING RESECTION IN CONJUNCTION WITH MULTIPLE CAMERAS

IMAGE DOWNLOADED CHANGES BASED ON VIEWING DIRECTION
Fig. 23A Top Down View of Home Theater, t = 1
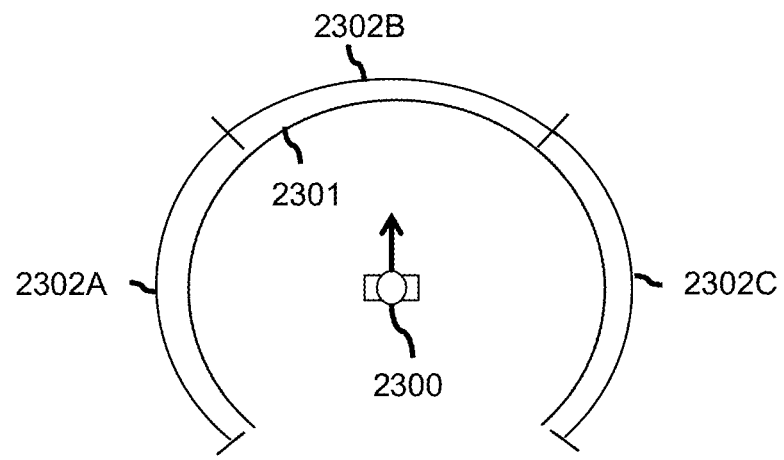
Fig. 23B Top Down View of Home Theater, t = 2
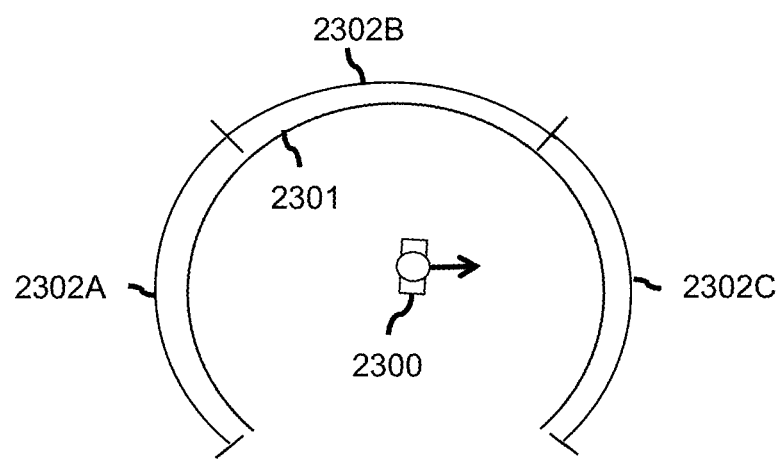

IMMERSIVE VIEWING EXPERIENCE

CROSS REFERENCE TO RELATED APPLICATIONS

This application is a continuation-in part of U.S. patent application Ser. No. 17/225,610 filed on 7 Apr. 2021, which is a continuation-in-part of U.S. patent application Ser. No. 17/187,828 filed on Feb. 28, 2021.

TECHNICAL FIELD

Aspects of this disclosure are generally related to use of distribution of work.

INTRODUCTION

Movies are a form of entertainment.

SUMMARY

All examples, aspects and features mentioned in this document can be combined in any technically conceivable way. This patent teaches a method, software and apparatus for an immersive viewing experience.

In general, this patent improves on techniques taught in U.S. patent application Ser. No. 17/225,610 filed on 7 Apr. 2021, which is incorporated by reference in its entirety. Some of the apparatuses described in U.S. patent application Ser. No. 17/225,610 have capabilities to generate extremely large datasets. This patent improved the display of such extremely large datasets.

This patent discloses, a system, a method, an apparatus and software to achieve an improved immersive viewing experience. First, upload a user's viewing parameter to a cloud wherein said cloud stores imagery (which in the preferred embodiments is extremely large datasets). Viewing parameters can include any action, gesture, body position, eye look angle, eye convergence/vergence or input (e.g., via a graphical user interface). Thus, in near real time, user's viewing parameters are characterized (e.g., by a variety of devices, such as eye-facing cameras, cameras to record gestures) and sent to the cloud. Second, a set of user-specific imagery is optimized from said imagery wherein said user-specific imagery is based on at least said viewing parameter. In the preferred embodiment, the field of view of the user-specific imagery is smaller than the imagery. In the preferred embodiment, the location where a user is looking would have high resolution and the location where the user is not looking would have low resolution. For example, if a user is looking at an object on the left, then the user-specific imagery would be high resolution on the left side. In some embodiments, a user-specific imagery would be streamed in near-real time.

In some embodiments, the user-specific imagery comprises a first portion with a first spatial resolution and a second portion with a second spatial resolution, and wherein said first spatial resolution is higher than said second spatial resolution. Some embodiments comprise wherein said viewing parameter comprises a viewing location and wherein said viewing location corresponds to said first portion.

Some embodiments comprise wherein user-specific imagery comprises a first portion with a first zoom setting and a second portion with a second zoom setting, and wherein said first zoom setting is higher than said second zoom setting. Some embodiments comprise wherein a first portion is determined by said viewing parameter wherein said viewing parameter comprises at least one of the group consisting of: a position of said user's body; an orientation of said user's body; a gesture of said user's hand; a facial expression of said user; a position of said user's head; and an orientation of said user's head. Some embodiments comprise wherein a first portion is determined by a graphical user interface, such as a mouse or controller.

Some embodiments comprise wherein the imagery comprises a first field of view (FOV) and wherein said user-specific imagery comprises a second field of view, and wherein said first FOV is larger than said second FOV.

Some embodiments comprise wherein imagery comprises stereoscopic imagery and wherein said stereoscopic imagery is obtained via stereoscopic cameras or stereoscopic camera clusters.

Some embodiments comprise wherein said imagery comprises stitched imagery wherein said stitched imagery is generated by at least two cameras.

Some embodiments comprise wherein said imagery comprises composite imagery, wherein said composite imagery is generated by: taking an first image of a scene with a first set of camera settings wherein said first set of camera settings causes a first object to be in focus and a second object to be out of focus; and taking an second image of a scene with a second set of camera settings wherein said second set of camera settings causes said second object to be in focus and said first object to be out of focus. Some embodiments comprise wherein when user looks at said first object, said first image would be presented to said user and when user looks at said second object, said second image would be presented to said user. Some embodiments comprise combining at least said first object from said first image and said second object from said second image into said composite image.

Some embodiments comprise wherein image stabilization is performed. Some embodiments comprise wherein said viewing parameter comprises convergence. Some embodiments comprise wherein user-specific imagery is 3D imagery wherein said 3D imagery is presented on a HDU, a set of anaglyph glasses or a set of polarized glasses.

Some embodiments comprise wherein said user-specific imagery is presented to said user on a display wherein said user has at least a $0.5\pi$ steradian field of view.

Some embodiments comprise wherein user-specific imagery is presented on a display. In some embodiments, the display is a screen (e.g., TV, reflective screen coupled with a projector system, an extended reality head display unit including an augmented reality display, a virtual reality display or a mixed reality display).

BRIEF DESCRIPTION OF THE FIGURES

FIG. 2 illustrates methods to determine which stereo pair to display to a user for a given time point.

FIG. 9A illustrates a top down view of all data gathered of a scene at a time point.

FIG. 9B illustrates a displayed wide angle 2D image frame of the video recording.

FIG. 9C illustrates a top down view of User A's viewing angle of −70° and 55° FOV.

FIG. 9D illustrates what User A would see given User A's viewing angle of −70° and 55° FOV.

FIG. 9E illustrates a top down view of User B's viewing angle of +50° and 85° FOV.

FIG. 9F illustrates what User B would see given User B's viewing angle of +50° and 85° FOV.

FIG. 10A illustrates the field of view captured at a first time point by the left camera.

FIG. 10B illustrates the field of view captured at a first time point by the right camera.

FIG. 10C illustrates a first user's personalized field of view (FOV) at a given time point.

FIG. 10D illustrates a second user's personalized field of view (FOV) at a given time point.

FIG. 10E illustrates a third user's personalized field of view (FOV) at a given time point.

FIG. 10F illustrates a fourth user's personalized field of view (FOV) at a given time point.

FIG. 11A illustrates a top down view of the first user's left eye view.

FIG. 11B illustrates a top down view of the first user's left eye view wherein a convergence point in close proximity to the left eye and right eye.

FIG. 11C illustrates a left eye view at time point 1 without convergence.

FIG. 11D illustrates a left eye view at time point 2 with convergence.

FIG. 13A illustrates a top down view of a home theater.

FIG. 13B illustrates a side view of the home theater as shown in FIG. 13A.

FIG. 14A illustrates a top down view of a home theater.

FIG. 14B illustrates a side view of the home theater as shown in FIG. 14A.

FIG. 15A illustrates a near-spherical TV with a user looking straight ahead at time point #1.

FIG. 15B shows the portion of the TV and the field of view being observed by the user at time point #1.

FIG. 15C illustrates a near-spherical TV with a user looking straight ahead at time point #2.

FIG. 15D shows the portion of the TV and the field of view being observed by the user at time point #2.

FIG. 15E illustrates a near-spherical TV with a user looking straight ahead at time point #3.

FIG. 15F shows the portion of the TV and the field of view being observed by the user at time point #3.

FIG. 23A illustrates a top down view of a person looking forward to the center of the screen of the home theater.

FIG. 23B illustrates a top down view of a person looking forward to the right side of the screen of the home theater.

DETAILED DESCRIPTIONS

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 1:
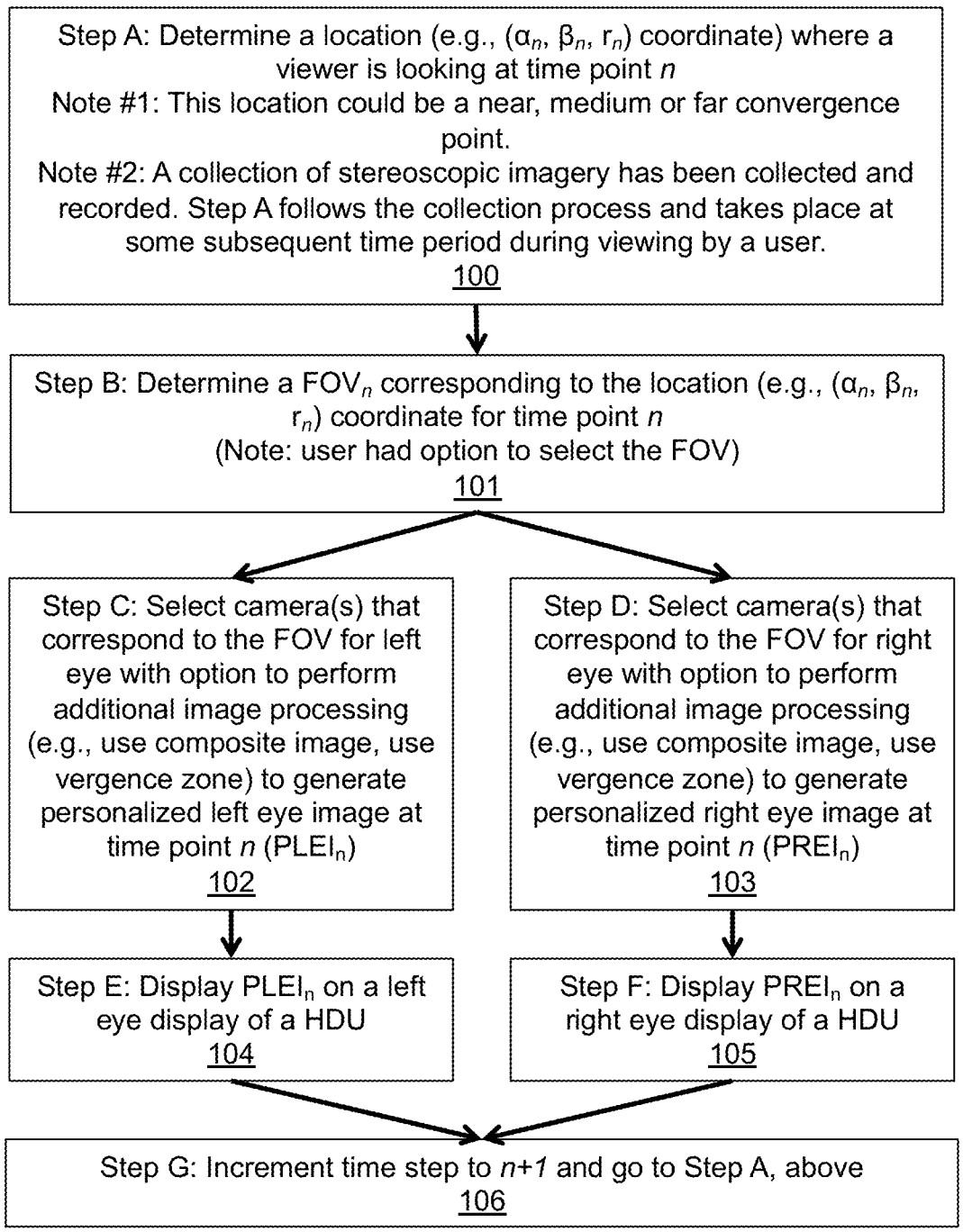
FIG. 1 illustrates the FIG. 1 illustrates retrospective display of stereoscopic images.

FIG. 1 illustrates retrospective display of stereoscopic images. 100 illustrates step A, which is to determine a location (e.g., ($\alpha_n$, $\beta_n$, $r_n$) coordinate) where a viewer is looking at time point n. Note #1: This location could be a near, medium or far convergence point. Note #2: A collection of stereoscopic imagery has been collected and recorded. Step A follows the collection process and takes place at some subsequent time period during viewing by a user. 101 illustrates step B, which is to determine a $FOV_n$ corresponding to the location (e.g., ($\alpha_n$, $\beta_n$, $r_n$) coordinate for time point n. Note: user had option to select the FOV). 102 illustrates step C, which is to select camera(s) that correspond to the FOV for left eye with option to perform additional image processing (e.g., use composite image, use vergence zone) to generate personalized left eye image at time point n ($PLEI_n$). 103 illustrates step D, which is to select camera(s) that correspond to the FOV for right eye with option to perform additional image processing (e.g., use composite image, use vergence zone) to generate personalized right eye image at time point n (PREI$_n$). 104 illustrates step E, which is to display PLEI$_n$ on a left eye display of a HDU. 105 illustrates step F, which is to display PREI$_n$ on a right eye display of a HDU. 106 illustrates step G, which is to increment time step to n+1 and go to Step A, above.

FIG. 2 illustrates methods to determine which stereo pair to display to a user for a given time point. 200 illustrates a text box of analyzing the user's parameters to determine which stereoscopic image to display to the user. First, use the viewing direction of a user's head. For example, if user's head is in a forward direction, a first stereo pair could be used and if a user's head is in a direction toward the left a second stereo pair could be used. Second, use the viewing angle of the user's gaze. For example, if user is looking in a direction towards a distant object (e.g., mountain in the distance), then the distant (e.g., zone 3) stereo image pair would be selected for that time point. Third, use the user's convergence. For example, if a viewing direction of a near object (e.g., leaf on a tree) is extremely similar to a viewing direction to a distant object (e.g., mountain in the distance), option to use combination of convergence and viewing angle. Fourth, use the accommodation of the user's eyes. For example, monitor a user's pupil size and use change in size to indicate where (near/far) the user is looking.

Figure 3:
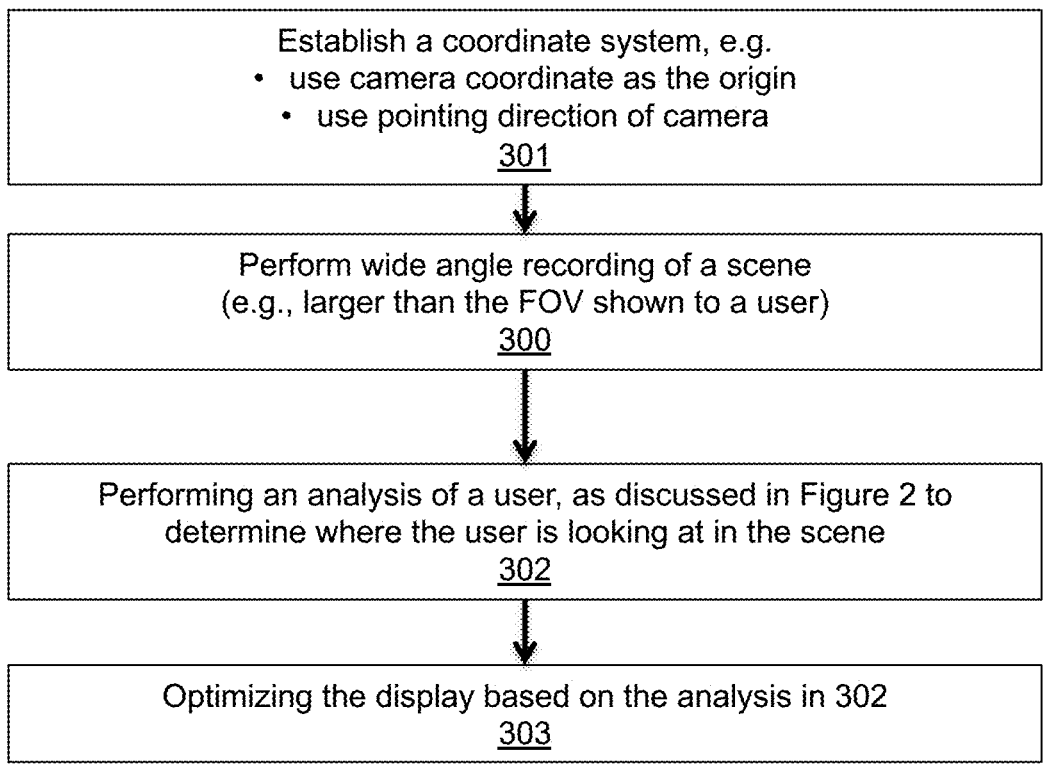
FIG. 3 illustrates displaying a video recording on a HDU.

FIG. 3 illustrates displaying a video recording on a HDU. 300 illustrates establishing a coordinate system. For example, use camera coordinate as the origin and use pointing direction of camera as an axis. This is discussed in more detail in U.S. patent application Ser. No. 17/225,610, which is incorporated by reference in its entirety. 301 illustrates performing wide angle recording of a scene. For example, record data with a FOV larger than the FOV shown to a user). 302 illustrates performing an analysis of a user, as discussed in FIG. 2 to determine where the user is looking at in the scene. 303 illustrates optimizing the display based on the analysis in 302. In some embodiments, a feature (e.g., position, size, shape, orientation, color, brightness, texture, classification by AI algorithm) of a physical object determines a feature (e.g., position, size, shape, orientation, color, brightness, texture) of a virtual object. For example, a user is using a mixed reality display in a room in a house wherein some of the areas in the room (e.g., a window during the daytime) are bright and some of the areas in the room are dark (e.g., a dark blue wall). In some embodiments, the position of placement of virtual objects is based on the location of objects within the room. For example, a virtual object could be colored white if the background is a dark blue wall, so that it stands out. For example, a virtual object could be colored blue if the background is a white wall, so that it stands out. For example, an virtual object could be positioned (or re-positioned) so its background is such that the virtual object can be displayed in a fashion to optimize viewing experience for a user.

Figure 4:
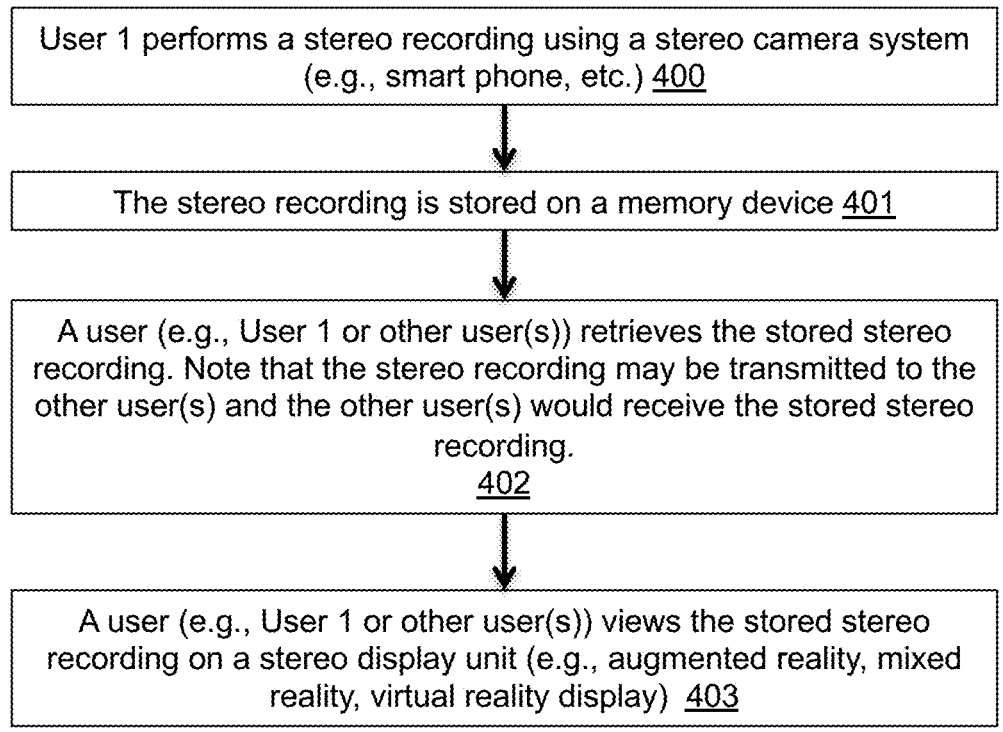
FIG. 4 illustrates a pre-recorded stereo viewing performed by user 1.

FIG. 4 illustrates a pre-recorded stereo viewing performed by user 1. 400 illustrates user 1 performing a stereo recording using a stereo camera system (e.g., smart phone, etc.). This is discussed in more detail in U.S. patent application Ser. No. 17/225,610, which is incorporated by reference in its entirety. 401 illustrates the stereo recording being stored on a memory device. 402 illustrates a user (e.g., User 1 or other user(s)) retrieving the stored stereo recording. Note that the stereo recording may be transmitted to the other user(s) and the other user(s) would receive the stored stereo recording. 403 illustrates a user (e.g., User 1 or other user(s)) viewing the stored stereo recording on a stereo display unit (e.g., augmented reality, mixed reality, virtual reality display).

Figure 5:
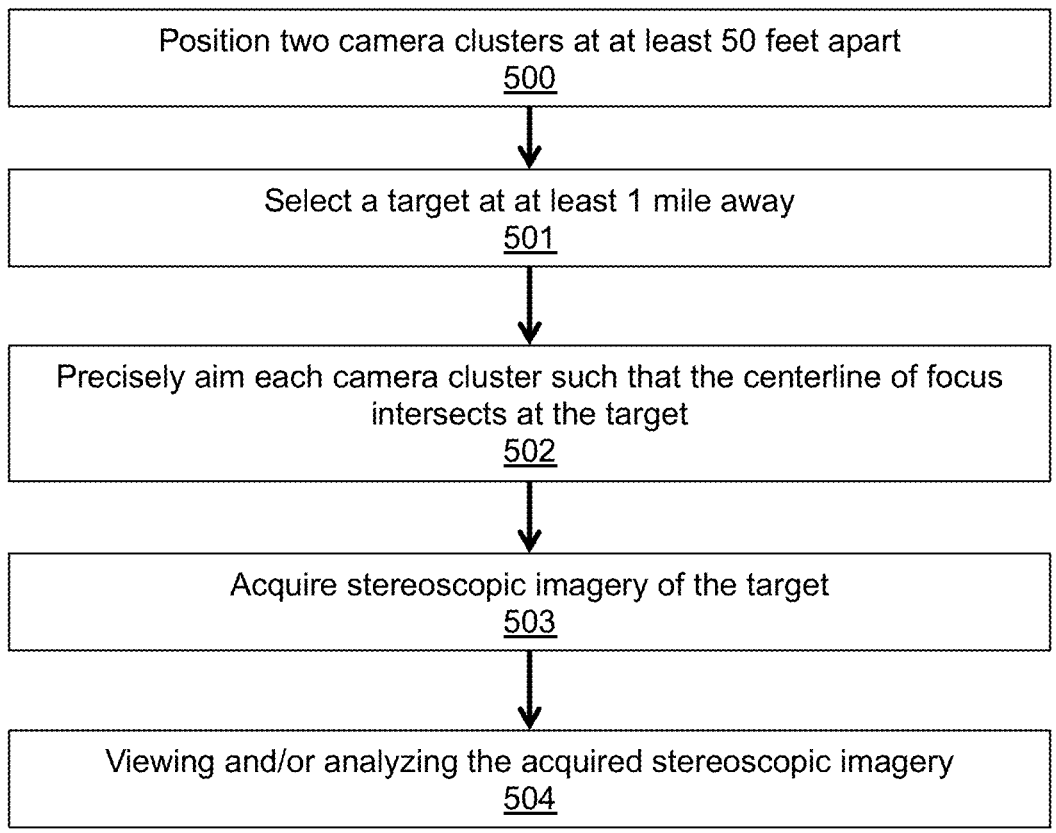
FIG. 5 illustrates performing long range stereoscopic imaging of a distant object using stereoscopic camera clusters.

FIG. 5 illustrates performing long range stereoscopic imaging of a distant object using stereoscopic camera clusters. 500 illustrates positioning two camera clusters at at least 50 feet apart. 501 illustrates elects a target at at least 1 mile away. 502 illustrates precisely aiming each camera cluster such that the centerline of focus intersects at the target. 503 illustrates acquiring stereoscopic imagery of the target. 504 illustrates viewing and/or analyzing the acquired stereoscopic imagery. Some embodiments use cameras with telephoto lenses rather than camera clusters. Also, some embodiments, have stereo separation of less than or equal to 50 feet apart for optimized viewing of less than 1 mile away.

Figure 6:
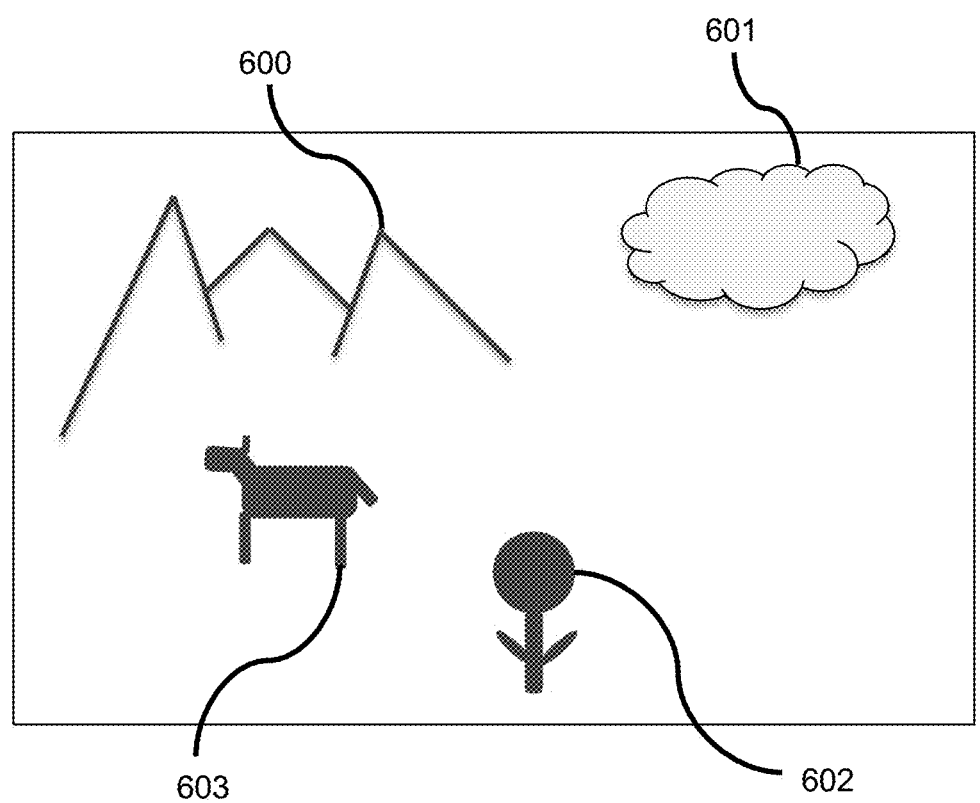
FIG. 6 illustrates a capability of post-acquisition adjusting the images to bring into the best possible picture based on user eye tracking by the generation of a stereoscopic composite image.

FIG. 6 illustrates a capability of post-acquisition adjusting the images to bring into the best possible picture based on user eye tracking by the generation of a stereoscopic composite image. The stereoscopic images displayed at this time point has several objects that might be of interest to a person observing the scene. Thus, at each time point, a stereoscopic composite image will be generated to match at least one user's input. For example, if a user is viewing (eye tracking determines viewing location) the mountains 600 or cloud 601 at a first time point, then the stereoscopic composite image pair delivered to a HDU would be generated such that the distant objects of the mountains 600 or cloud 601 were in focus and the nearby objects including the deer 603 and the flower 602 were out of focus. If the user was viewing (eye tracking determines viewing location) a deer 603, then the stereoscopic composite images presented at this frame would be optimized for medium range. Finally, if a user is viewing (eye tracking determines viewing location) a nearby flower 603, then the stereoscopic composite images would be optimized for closer range (e.g., implement convergence, and blur out distant items, such as the deer 603, the mountains 600 and the cloud 601). A variety of user inputs could be used to indicate to a software suite how to optimize the stereoscopic composite images. Gestures such as squint could be used to optimize the stereoscopic composite image for more distant objects. Gestures such as lean forward could be used to zoom in to a distant object. A GUI could also be used to improve the immersive viewing experience.

Figure 7A:
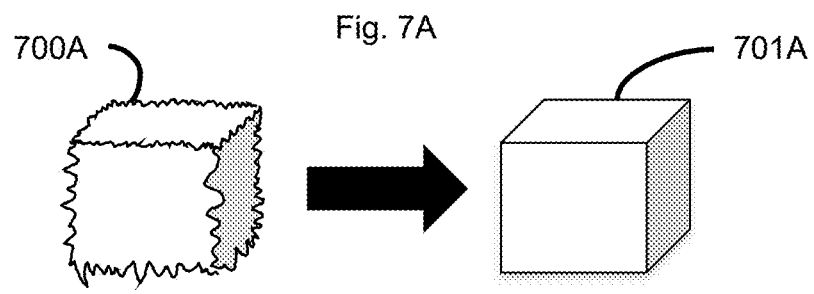
FIG. 7A illustrates an image with motion and the application of image stabilization processing.

FIG. 7A illustrates an image with motion and the application of image stabilization processing. 700A illustrates a left eye image of an object wherein there is motion blurring the edges of the object. 701A illustrates a left eye image of an object wherein image stabilization processing has been applied.

Figure 7B:
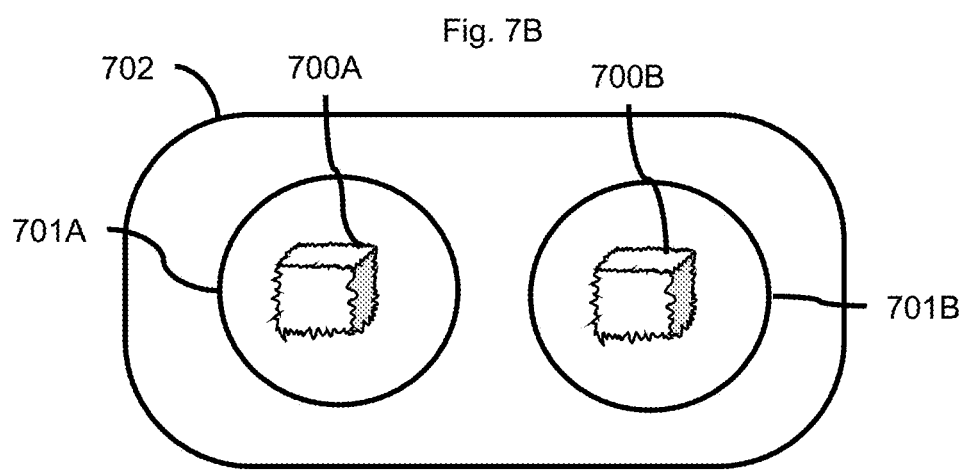
FIG. 7B illustrates an image with motion displayed in a HDU.

FIG. 7B illustrates an image with motion displayed in a HDU. 702 illustrates the HDU. 700A illustrates a left eye image of an object wherein there is motion blurring the edges of the object. 700B illustrates a right eye image of an object wherein there is motion blurring the edges of the object. 701A illustrates a left eye display, which is aligned with a left eye of a user. 701B illustrates a right eye display, which is aligned with a right eye of a user.

Figure 7C:
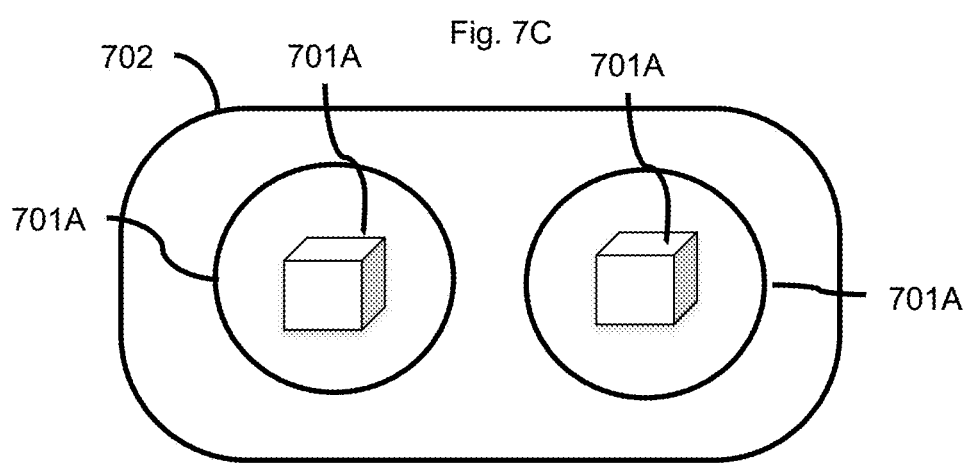
FIG. 7C illustrates an image stabilization applied to the image using stereoscopic imagery.

FIG. 7C illustrates an image stabilization applied to the image using stereoscopic imagery. A key task of image processing is the image stabilization using stereoscopic imagery. 700A illustrates a left eye image of an object wherein image stabilization processing has been applied. 700B illustrates a left eye image of an object wherein image stabilization processing has been applied. 701A illustrates a left eye display, which is aligned with a left eye of a user. 701B illustrates a right eye display, which is aligned with a right eye of a user. 702 illustrates the HDU.

Figure 8A:
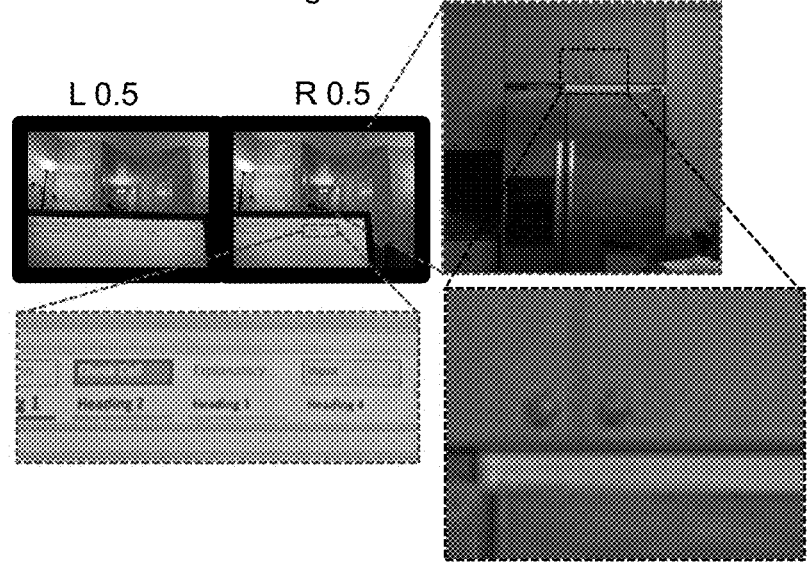
FIG. 8A illustrates a left image and a right image with a first camera setting.

FIG. 8A illustrates a left image and a right image with a first camera setting. Note that the text on the monitor is in focus and the distant object of the knob on the cabinet is out of focus.

Figure 8B:
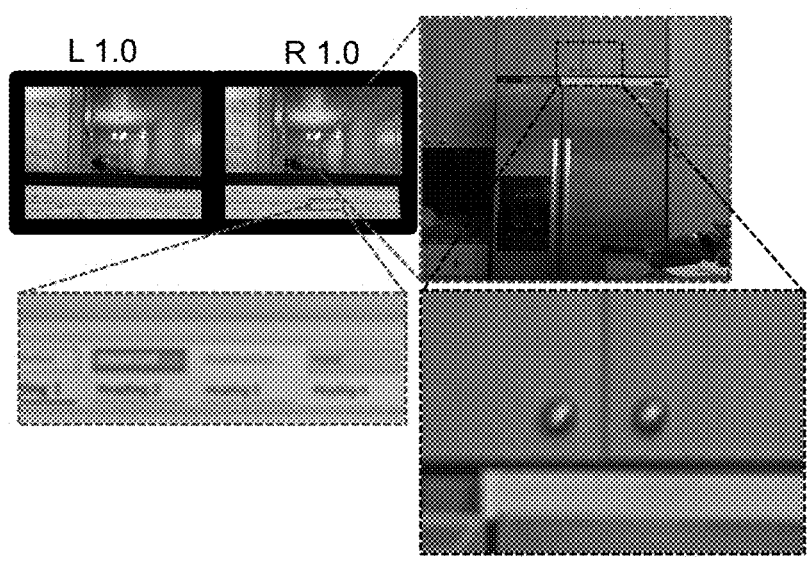
FIG. 8B illustrates a left image and a right image with a second camera setting.

FIG. 8B illustrates a left image and a right image with a second camera setting. Note that the text on the monitor is out of focus and the distant object of the knob on the cabinet is in focus. A point of novelty is using at least two cameras. A first image from a first camera is obtained. A second image from a second camera is obtained. The first camera and the second camera are in the same viewing perspectives. Also, they are of the scene (e.g., a still scene or a same time point of an scene with movement/changes). A composite image is generated wherein a first portion of the composite image is obtained from the first image and a second portion of the composite image is obtained from the second image. Note that in some embodiments, an object within the first image can be segmented and the same object within the second image can also be segmented. The first image of the object and the second image of the object can be compared to see which one has better quality. The image with better image quality can be added to the composite image. In some embodiments, however, deliberately selecting some portions to be not clear can be performed.

FIG. 9A illustrates a top down view of all data gathered of a scene at a time point.

FIG. 9B illustrates a displayed wide angle 2D image frame of the video recording. Note that displaying this whole field of view to a user would be distorted given the mismatch between the user's intrinsic FOV (human eye FOV) and the camera system FOV.

FIG. 9C illustrates a top down view of User A's viewing angle of −70° and 55° FOV. A key point of novelty is the user's ability to select the portion of the stereoscopic imagery with the viewing angle. Note that the selected portion could realistically be up to ~180°, but not more.

FIG. 9D illustrates what User A would see given User A's viewing angle of −70° and 55° FOV. This improves over the prior art because it allows different viewers to see different portions of the field of view. While a human has a horizontal field of view of slightly more than 180 degrees, a human can only read text over approximately 10 degrees of the field of view, can only assess shape over approximately 30 degrees of the field of view and can only assess colors over approximately 60 degrees of the field of view. In some embodiments, filtering (subtracting) is performed. A human has a vertical field of view of approximately 120 degrees with an upward (above the horizontal) field of view of 50 degrees and a downward (below the horizontal) field of view of approximately 70 degrees. Maximum eye rotation however, is limited to approximately 25 degrees above the horizontal and approximately 30 degrees below the horizontal. Typically, the normal line of sight from the seated position is approximately 15 degreed below the horizontal.

FIG. 9E illustrates a top down view of User B's viewing angle of +50° and 85° FOV. A key point of novelty is the user's ability to select the portion of the stereoscopic imagery with the viewing angle. Also, note that the FOV of User B is larger than the FOV of User A. Note that the selected portion could realistically be up to ~180°, but not more because of the limitations of the human eye.

FIG. 9F illustrates what User B would see given User B's viewing angle of +50° and 85° FOV. This improves over the prior art because it allows different viewers to see different portions of the field of view. In some embodiments, multiple cameras are recording for a 240° film. In one embodiment, 4 cameras (each with a 60° sector) for simultaneous recording. In another embodiment, the sectors are filmed sequentially—one at a time. Some scenes of a film could be filmed sequentially and other scenes could be filed simultaneously. In some embodiments, a camera set up could be used with overlap for image stitching. Some embodiments comprise using a camera ball system described in described in U.S. patent application Ser. No. 17/225,610, which is incorporated by reference in its entirety. After the imagery is recorded, imagery from the cameras are edited to sync the scenes and stitch them together. LIDAR devices can be integrated into the camera systems for precise camera direction pointing.

FIG. 10A illustrates the field of view captured at a first time point by the left camera. The left camera 1000 and right camera 1001 are shown. The left FOV 1002 is shown by the white region and is approximately 215° and would have an a ranging from +90° to −135° (sweeping from +90° to −135° in a counterclockwise direction). The area not imaged within the left FOV 1003 would be approximately 135° and would have an a ranging from +90° to −135° (sweeping from +90° to −135° in a clockwise direction).

FIG. 10B illustrates the field of view captured at a first time point by the right camera. The left camera 1000 and right camera 1001 are shown. The right FOV 1004 is shown by the white region and is approximately 215° and would have an a ranging from +135° to −90° (sweeping from +135° to −90° in a counterclockwise direction). The area not imaged within the right FOV 1005 would be approximately 135° and would have an a ranging from +135° to −90° (sweeping from +135° to −90° in a counterclockwise direction).

FIG. 10C illustrates a first user's personalized field of view (FOV) at a given time point. 1000 illustrates the left camera. 1001 illustrates the right camera. 1006a illustrates the left boundary of the left eye FOV for the first user, which is shown in light gray. 1007a illustrates the right side boundary of the left eye FOV for the first user, which is shown in light gray. 1008a illustrates the left boundary of the right eye FOV for the first user, which is shown in light gray. 1009a illustrates the right side boundary of the right eye FOV for the first user, which is shown in light gray. 1010a illustrates the center line of the left eye FOV for the first user. 1011a illustrates the center line of the right eye FOV for the first user. Note that the center line of the left eye FOV 1010a for the first user and the center line of the right eye FOV 1011a for the first user are parallel, which is equivalent to a convergence point at infinity. Note that the first user is looking in the forward direction. It is suggested that during filming of a moving that most of the action in the scene occur in this forward looking direction.

FIG. 10D illustrates a second user's personalized field of view (FOV) at a given time point. 1000 illustrates the left camera. 1001 illustrates the right camera. 1006b illustrates the left boundary of the left eye FOV for the second user, which is shown in light gray. 1007b illustrates the right side boundary of the left eye FOV for the second user, which is shown in light gray. 1008b illustrates the left boundary of the right eye FOV for the second user, which is shown in light gray. 1009b illustrates the right side boundary of the right eye FOV for the second user, which is shown in light gray. 1010b illustrates the center line of the left eye FOV for the second user. 1011b illustrates the center line of the right eye FOV for the second user. Note that the center line of the left eye FOV 1010b for the second user and the center line of the right eye FOV 1011b for the second user meet at a convergence point 1012. This allows the second user to view a small object with greater detail. Note that the second user is looking in the forward direction. It is suggested that during filming of a moving that most of the action in the scene occur in this forward looking direction.

FIG. 10E illustrates a third user's personalized field of view (FOV) at a given time point. 1000 illustrates the left camera. 1001 illustrates the right camera. 1006c illustrates the left boundary of the left eye FOV for the third user, which is shown in light gray. 1007c illustrates the right side boundary of the left eye FOV for the third user, which is shown in light gray. 1008c illustrates the left boundary of the right eye FOV for the third user, which is shown in light gray. 1009c illustrates the right side boundary of the right eye FOV for the third user, which is shown in light gray. 1010c illustrates the center line of the left eye FOV for the third user. 1011c illustrates the center line of the right eye FOV for the third user. Note that the center line of the left eye FOV 1010c for the third user and the center line of the right eye FOV 1011c for the third user are approximately parallel, which is equivalent to looking at a very far distance. Note that the third user is looking in a moderately leftward direction. Note that the overlap of the left eye FOV and right eye FOV provide stereoscopic viewing to the third viewer.

FIG. 10F illustrates a fourth user's personalized field of view (FOV) at a given time point. 1000 illustrates the left camera. 1001 illustrates the right camera. 1006d illustrates the left boundary of the left eye FOV for the fourth user, which is shown in light gray. 1107d illustrates the right side boundary of the left eye FOV for the fourth user, which is shown in light gray. 1008d illustrates the left boundary of the right eye FOV for the fourth user, which is shown in light gray. 1009d illustrates the right side boundary of the right eye FOV for the fourth user, which is shown in light gray. 1010d illustrates the center line of the left eye FOV for the fourth user. 1011d illustrates the center line of the right eye FOV for the fourth user. Note that the center line of the left eye FOV 1010d for the fourth user and the center line of the right eye FOV 1011d for the fourth user are approximately parallel, which is equivalent to looking at a very far distance. Note that the fourth user is looking in a far leftward direction. Note that the first user, second user, third user and fourth user are all seeing different views of the movie at the same time point. It should be noted that some of the designs, such as the camera cluster or ball system as described in FIG. 11A illustrates a top down view of the first user's left eye view at time point 1. 1100 illustrates the left eye view point. 1101 illustrates the right eye viewpoint. 1102 illustrates the portion of the field of view (FOV) not covered by either camera. 1103 illustrates the portion of the FOV that is covered by at least one camera. 1104A illustrates a medial portion of a high resolution FOV used by a user, which corresponds to α=+25°. This is discussed in more detail in U.S. patent application Ser. No. 17/225,610, which is incorporated by reference in its entirety.

1105A illustrates a lateral portion of a high resolution FOV used by a user, which corresponds to α=−25°.

FIG. 11B illustrates a top down view of the first user's left eye view wherein a convergence point in close proximity to the left eye and right eye. 1100 illustrates the left eye view point.

1101 illustrates the right eye viewpoint. 1102 illustrates the portion of the field of view (FOV) not covered by either camera. 1103 illustrates the portion of the FOV that is covered by at least one camera. 1104B illustrates a medial portion of a high resolution FOV used by a user, which corresponds to α=−5°. 1105B illustrates a lateral portion of a high resolution FOV used by a user, which corresponds to α=+45°.

FIG. 11C illustrates a left eye view at time point 1 without convergence. Note that a flower 1106 is shown in the image, which is locate along the viewing angle α=0°.

FIG. 11D illustrates a left eye view at time point 2 with convergence. Note that a flower 1106 is shown in the image, which is still located along the viewing angle α=0°. However, the user has converged during this time point. This act of convergence causes the left eye field of view to be altered from a horizontal field of view with a ranging between −25° and 25° (as shown in FIGS. 11A and 11C) to a ranging between −5° and +45° (as shown in FIGS. 11B and 11D). This system improves upon the prior art because it provides stereoscopic convergence on stereoscopic cameras by shifting the images according to the left (and right) field of views. In some embodiments, a portion of the display is non-optimized, which is described in U.S. Pat. No. 10,712,837, which is incorporated by reference in its entirety.

Figure 12:
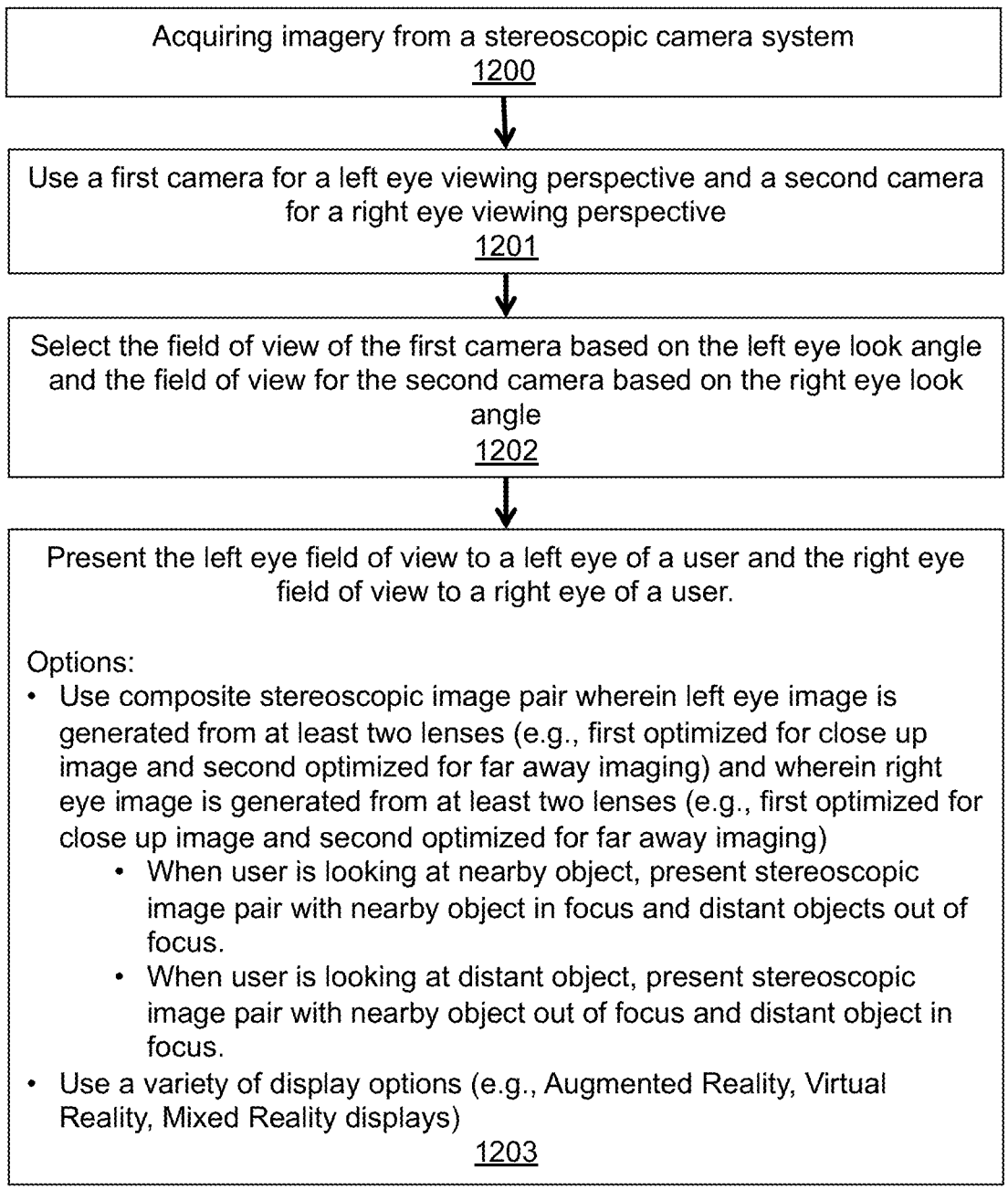
FIG. 12 illustrates the reconstruction of various stereoscopic images from previously acquired wide angle stereo images.

FIG. 12 illustrates the reconstruction of various stereoscopic images from previously acquired wide angle stereo images. 1200 illustrates acquiring imagery from a stereoscopic camera system. This is camera system is discussed in more detail in U.S. patent application Ser. No. 17/225,610, which is incorporated by reference in its entirety. 1201 illustrates wherein a first camera for a left eye viewing perspective and a second camera for a right eye viewing perspective is utilized. 1202 illustrates selecting the field of view of the first camera based on the left eye look angle and the field of view for the second camera based on the right eye look angle. In the preferred embodiment, the selection would be performed by a computer (e.g., integrated into a head display unit) based on an eye tracking system tracking eye movements of a user. It should also be noted that in the preferred embodiment, there would also be an image shift inward on the display closer to the nose during convergence, which is taught in U.S. Pat. No. 10,712,837 especially FIGS. 15A, 15B, 16A, and 16B, which is incorporated by reference in its entirety. 1203 illustrates presenting the left eye field of view to a left eye of a user and the right eye field of view to a right eye of a user. There are a variety of options at this juncture. First, use composite stereoscopic image pair wherein left eye image is generated from at least two lenses (e.g., first optimized for close up image and second optimized for far away imaging) and wherein right eye image is generated from at least two lenses (e.g., first optimized for close up image and second optimized for far away imaging). When user is looking at nearby object, present stereoscopic image pair with nearby object in focus and distant objects out of focus. When user is looking at distant object, present stereoscopic image pair with nearby object out of focus and distant object in focus. Second, use a variety of display devices (e.g., Augmented Reality, Virtual Reality, Mixed Reality displays).

FIG. 13A illustrates a top down view of a home theater. 1300 illustrates the user. 1301 illustrates the projector. 1302 illustrates the screen. Note that this immersive home theater is displays a field of view larger than a user's 1300 field of view. For example, if a user 1300 was looking straight forward, the home theater would display a horizontal FOV of greater than 180 degrees. Thus, the home theater's FOV would completely cover the user's horizontal FOV. Similarly, if the user was looking straight forward, the home theater would display a vertical FOV of greater than 120 degrees. Thus, the home theater's FOV would completely cover the user's vertical FOV. An AR/VR/MR headset could be used in conjunction with this system, but would not be required. Cheap anaglyph or disposable color glasses could also be used. A conventional IMAX polarized projector could be utilized with IMAX-type polarized disposable glasses. The size of the home theater could vary. The home theater walls could be built with white, reflective panels and framing. The projector would have multiple heads to cover the larger field of view.

FIG. 13B illustrates a side view of the home theater as shown in FIG. 13A. 1300 illustrates the user. 1301 illustrates the projector. 1302 illustrates the screen. Note that this immersive home theater is displays a field of view larger than a user's 1300 field of view. For example, if a user 100 was looking forward while on a recliner, the home theater would display a vertical FOV of greater than 120 degrees. Thus, the home theater's FOV would completely cover the user's FOV. Similarly, if the user was looking straight forward, the home theater would display a horizontal FOV of greater than 120 degrees. Thus, the home theater's FOV would completely cover the user's FOV.

FIG. 14A illustrates a top down view of a home theater. 1400A illustrates a first user. 1400B illustrates a first user. 1401 illustrates the projector. 1402 illustrates the screen. Note that this immersive home theater is displays a field of view larger than the FOV of the first user 1400A or the second user 1400B. For example, if the first user 1400A was looking straight forward, the first user 1400A would see a horizontal FOV of greater than 180 degrees. Thus, the home theater's FOV would completely cover the user's horizontal FOV. Similarly, if the first user 1400A was looking straight forward, the home theater would display a vertical FOV of greater than 120 degrees, as shown in FIG. 14B. Thus, the home theater's FOV would completely cover the user's vertical FOV. An AR/VR/MR headset could be used in conjunction with this system, but would not be required. Cheap anaglyph or polarized glasses could also be used. A conventional IMAX polarized projector could be utilized with IMAX-type polarized disposable glasses. The size of the home theater could vary. The home theater walls could be built with white, reflective panels and framing. The projector would have multiple heads to cover the larger field of view.

FIG. 14B illustrates a side view of the home theater as shown in FIG. 14A. 1400A illustrates the first user. 1401 illustrates the projector. 1402 illustrates the screen. Note that this immersive home theater is displays a field of view larger than the first user's 1400A field of view. For example, if the first user 1400A was looking forward while on a recliner, the user would see a vertical FOV of greater than 120 degrees. Thus, the home theater's FOV would completely cover the FOV of the first user 1400A. Similarly, if the first user 1400A was looking straight forward, the home theater would display a horizontal FOV of greater than 120 degrees. Thus, the home theater's FOV would completely cover the FOV of the first user 1400A.

A typical high resolution display has 4000 pixels over a 1.37 m distance. This would be equivalent to $10 \times 10^6$ pixels per 1.87 m². Consider the data for a hemisphere theater. Assume that the hemisphere theater has a radius of 2 meters. The surface area of a hemisphere is $2 \times \pi \times r^2$, which s equal to $(4)(3.14)(2^2)$ or 50.24 m². Assuming that a spatial resolution was desired to be equal to that of a typical high resolution display, this would equal $(50.24 \text{ m}^2)(10 \times 10^6$ pixels per 1.87 m²) or 429 million pixels. Assuming the frame rate of 60 frames per second. This is 26 times the amount of data as compared to a standard 4K monitor.

Some embodiments, comprise constructing a home theater to match the geometry of the projector. The preferred embodiment is sub-spherical (e.g., hemispherical). A low cost construction would be the use of a reflective surfaces stitched together with a multi-head projector. In some embodiments, a field of view comprises a spherical coverage with a $4\pi$ steradians. This can be accomplished via a HDU. In some embodiments, a field of view comprises sub-spherical coverage with at least $3\pi$ steradians. In some embodiments, a field of view comprises sub-spherical coverage with at least $2\pi$ steradians. In some embodiments, a field of view comprises sub-spherical coverage with at least $1\pi$ steradians. In some embodiments, a field of view comprises sub-spherical coverage with at least $0.5\pi$ steradians. In some embodiments, a field of view comprises sub-spherical coverage with at least $0.25\pi$ steradians. In some embodiments, a field of view comprises sub-spherical coverage with at least $0.05\pi$ steradians. In some embodiments, a sub-spherical IMAX system is created for an improved movie theater experience with many viewers. The chairs would be positioned in a similar position as standard movie theaters, but the screen would be sub-spherical. In some embodiments, non-spherical shapes could also be used.

FIG. 15A illustrates time point #1 wherein a user looking straight ahead and sees a horizontal field of view of approximately 60 degrees horizontal and 40 degrees vertical with a reasonably precise field of view (e.g., user can see shapes and colors in peripheral FOV).

FIG. 15B shows the center portion of the TV and the field of view being observed by the user at time point #1. Note that in some embodiments, data would be streamed (e.g., via the internet). Note that a novel feature of this patent is called "viewing-parameter directed streaming". In this embodiment, a viewing parameter is used to direct the data streamed. For example, if the user 1500 were looking straight forward, then a first set of data would be streamed to correspond with the straight forward viewing angle of the user 1500. If, however, the user were looking at to the side of the screen, a second set of data would be streamed to correspond with the looking to the side viewing angle of the user 1500. Other viewing parameters that could control viewing angles include, but are not limited to, the following: user's vergence; user's head position; user's head orientation. In a broad sense, any feature (age, gender, preference) or action of a user (viewing angle, positions, etc.) could be used to direct streaming. Note that another novel feature is the streaming of at least two image qualities. For example, a first image quality (e.g., high quality) would be streamed in accordance with a first parameter (e.g., within user's 30° horizontal FOV and 30° vertical FOV). And, a second image quality (e.g., lower quality) would be also be streamed that did not meet this criteria (e.g., not within user's 30° horizontal FOV and 30° vertical FOV). Surround sound would be implemented in this system.

FIG. 15C illustrates time point #2 wherein a user looking to the user's left side of the screen and sees a horizontal field of view of approximately 60 degrees horizontal and 40 degrees vertical with a reasonably precise field of view (e.g., user can see shapes and colors in peripheral FOV).

FIG. 15D illustrates time point #2 with the field of view being observed by the user at time point #2, which is different as compared to FIG. 15B. The area of interest is half that of time point #1. In some embodiments, greater detail and higher resolution of objects within a small FOV within the scene is provided to the user. Outside of this high resolution field of view zone, a lower resolution image quality could be presented on the screen.

FIG. 15E illustrates time point #3 wherein a user looking to the user's right side of the screen.

FIG. 15F illustrates time point #3 and sees a circularly shaped high-resolution FOV.

Figure 16A:
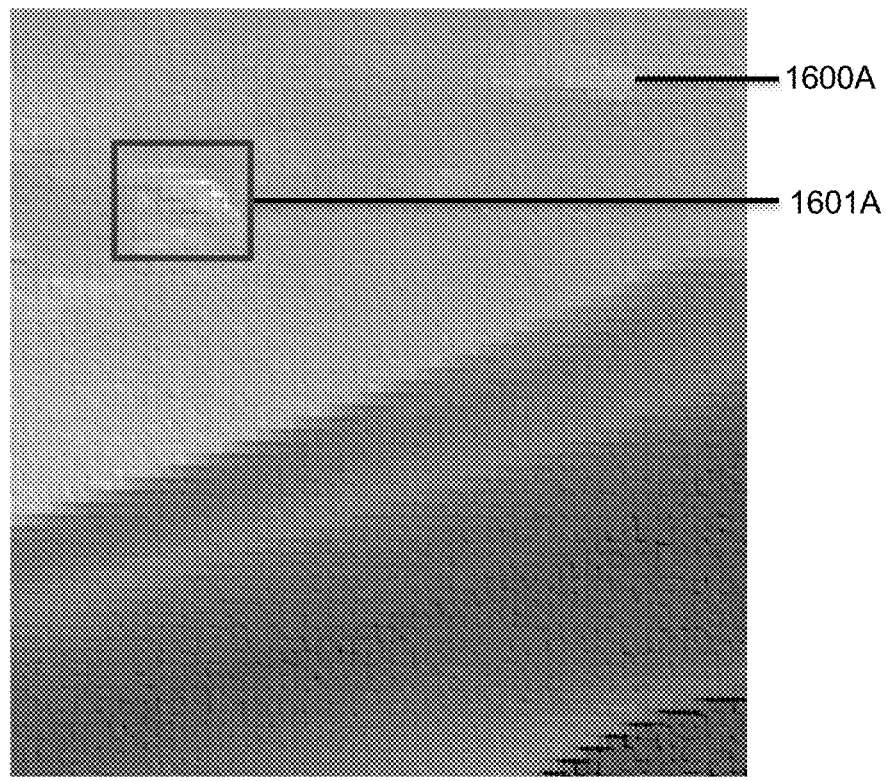
FIG. 16A illustrates an un-zoomed image.

FIG. 16A illustrates an un-zoomed image. 1600 illustrates the image. 1601A illustrates a box illustrated to denote the area within image 1600 that is set to be zoomed in on.

Figure 16B:
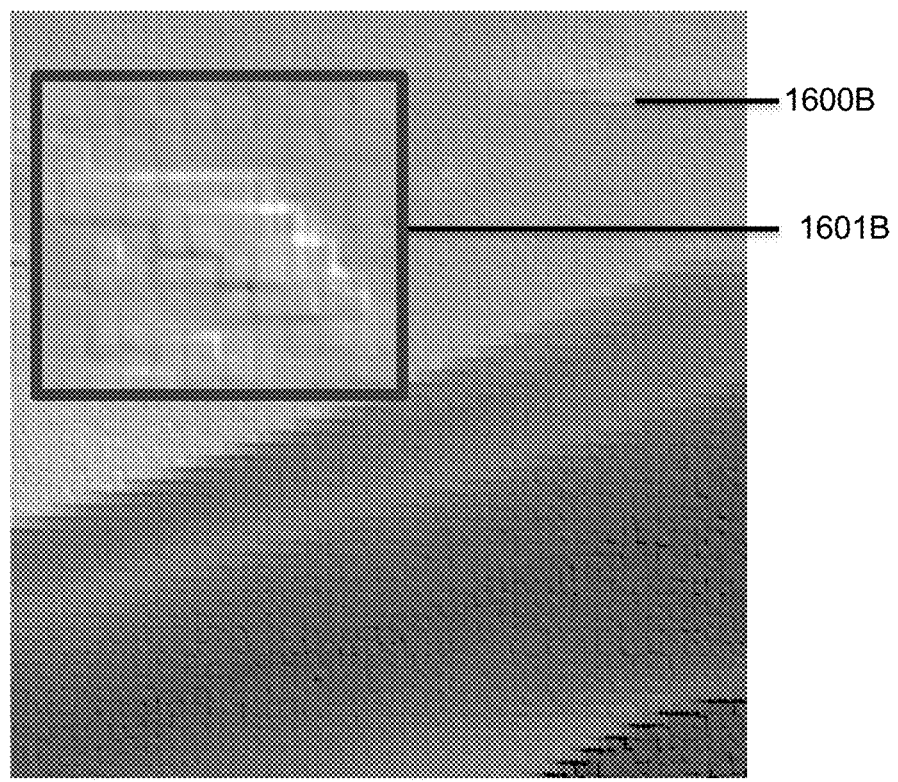
FIG. 16B illustrates a digital-type zooming in on a portion of an image.

FIG. 16B illustrates a digital-type zooming in on a portion of an image. This can be accomplished via methods described in U.S. Pat. No. 8,384,771 (e.g., 1 pixel turns into 4), which is incorporated by reference in its entirety. Note that a the area to be zoomed in on can be accomplished through a variety of user inputs including: gesture tracking systems; eye tracking systems; and, graphical user interfaces (GUIs). Note that the area within the image 1601A that was of denoted in FIG. 16A is now zoomed in on as shown in 1601B. Note that the resolution of region 1601B is equal to that of image 1600, but just larger. Note that 1600B illustrates portions of 1600A, which are not enlarged. Note that 1601A is now enlarged and note that portions of 1600A are not visualized.

Figure 17A:
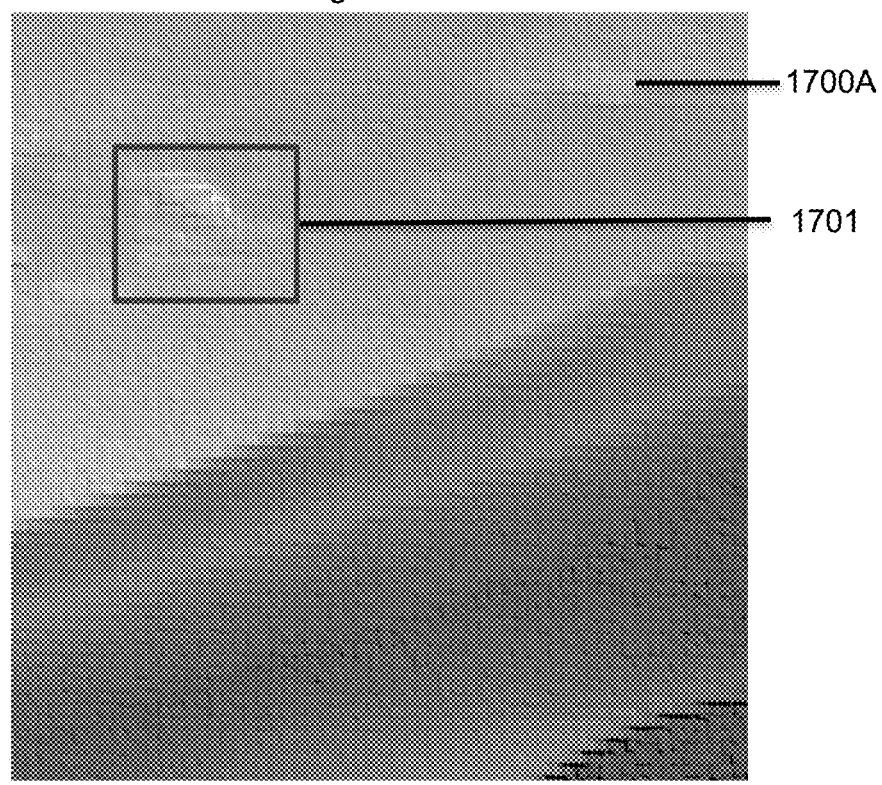
FIG. 17A illustrates an un-zoomed image.

FIG. 17A illustrates an un-zoomed image. 1700 illustrates the image. 1701A illustrates a box illustrated to denote the area within image 1700 that is set to be zoomed in on.

Figure 17B:
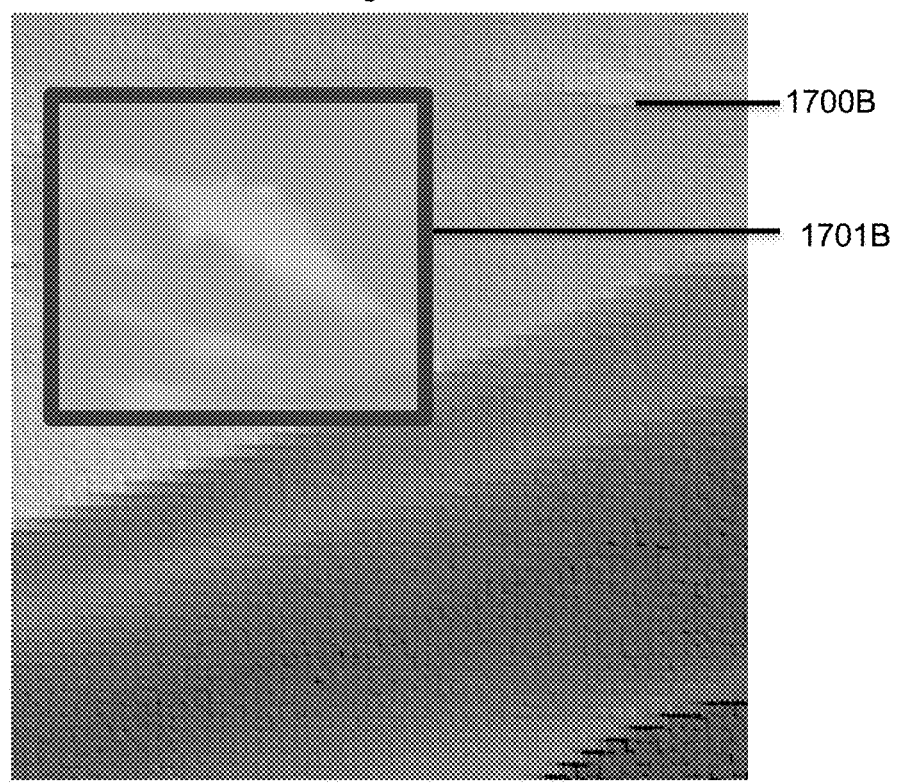
FIG. 17B illustrates the optical-type zooming in on a portion of an image.

FIG. 17B illustrates the optical-type zooming in on a portion of an image. Note that a the area to be zoomed in on can be accomplished through a variety of user inputs including: gesture tracking systems; eye tracking systems; and, graphical user interfaces (GUIs). Note that the area within the image 1701A that was of denoted in FIG. 17A is now zoomed in on as shown in 1701B and also note that the image inside of 1701B appears higher image quality. This can be done by selectively displaying the maximum quality imagery in region 1701B and enlarging region 1701B. Not only is the cloud bigger, the resolution of the cloud is also better. Note that 1700B illustrates portions of 1700A, which are not enlarged (Note that some of the portions of 1700A, which are not enlarged are now covered by the zoomed in region.)

Figure 18A:
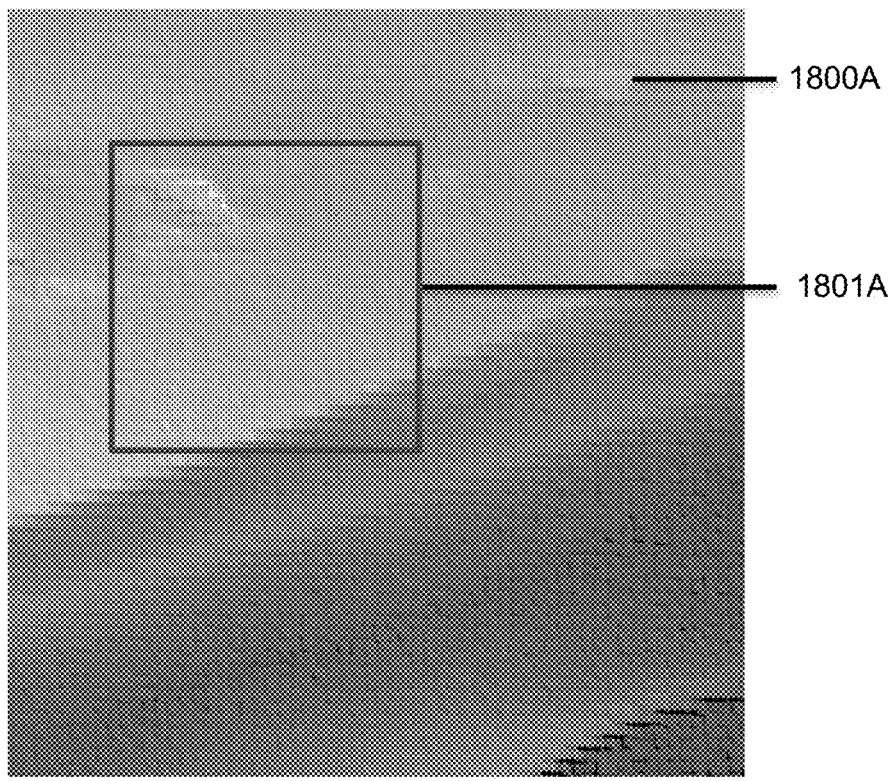
FIG. 18A illustrates a single resolution image.

FIG. 18A illustrates a single resolution image. 1800A illustrates the image. 1801A illustrates a box illustrated to denote the area within image 1800A that is set to have resolution improved in.

Figure 18B:
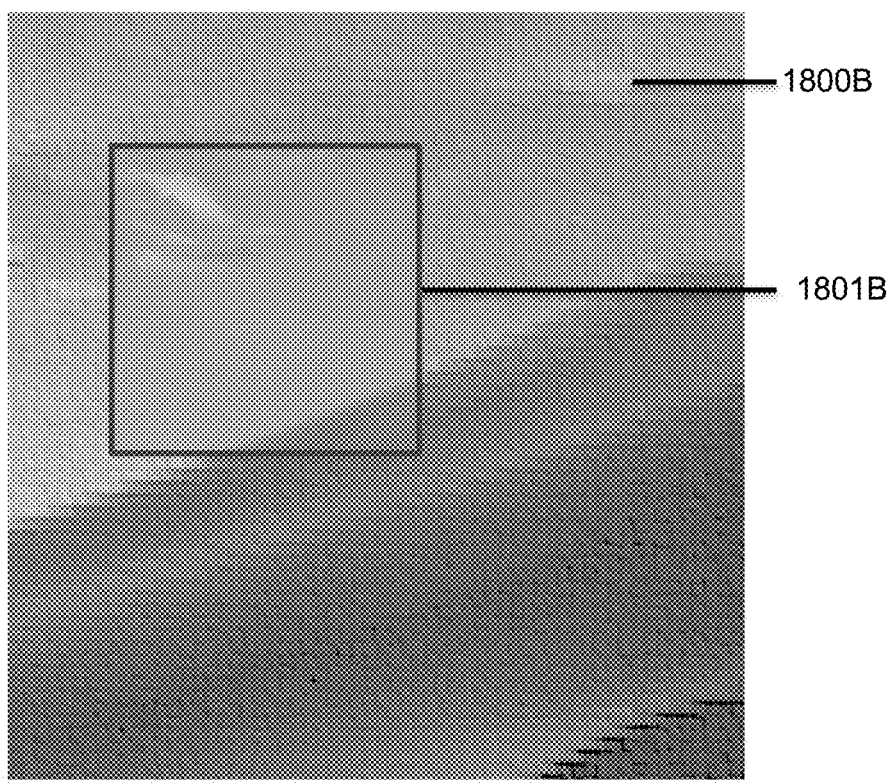
FIG. 18B illustrates a multi-resolution image.

FIG. 18B illustrates a multi-resolution image. Note that the area where resolution is improved can be accomplished through a variety of user inputs including: gesture tracking systems; eye tracking systems; and, graphical user interfaces (GUIs) to include a joystick or controller. Note that the area within the image 1801A that was of denoted in FIG. 18A is now displayed with higher resolution as shown in 1801B. In some embodiments, the image inside of 1801B can be changed in other options as well (e.g., different color scheme, different brightness settings, etc.). This can be done by selectively displaying a higher (e.g., maximum) quality imagery in region 1801B without enlarging region 1701B.

Figure 19A:
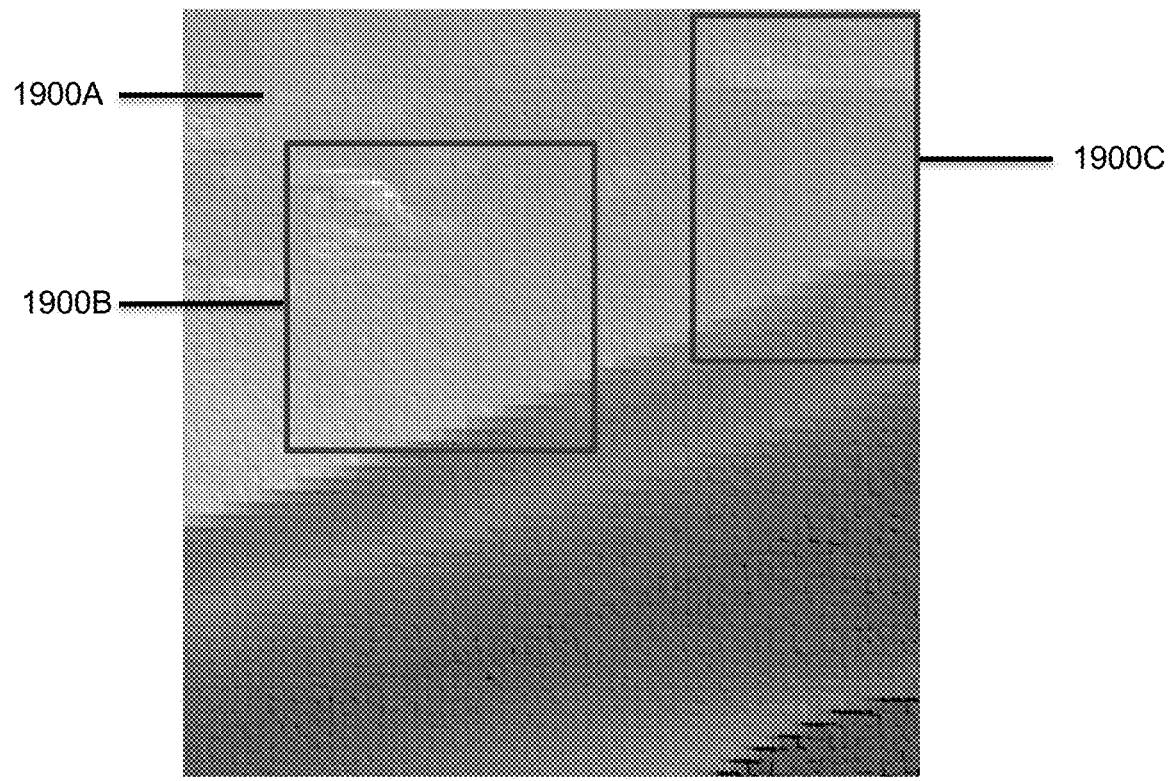
FIG. 19A illustrates a large field of view wherein a first user is looking at a first portion of the image and a second user is looking at a second portion of the image.
Figure 19B:
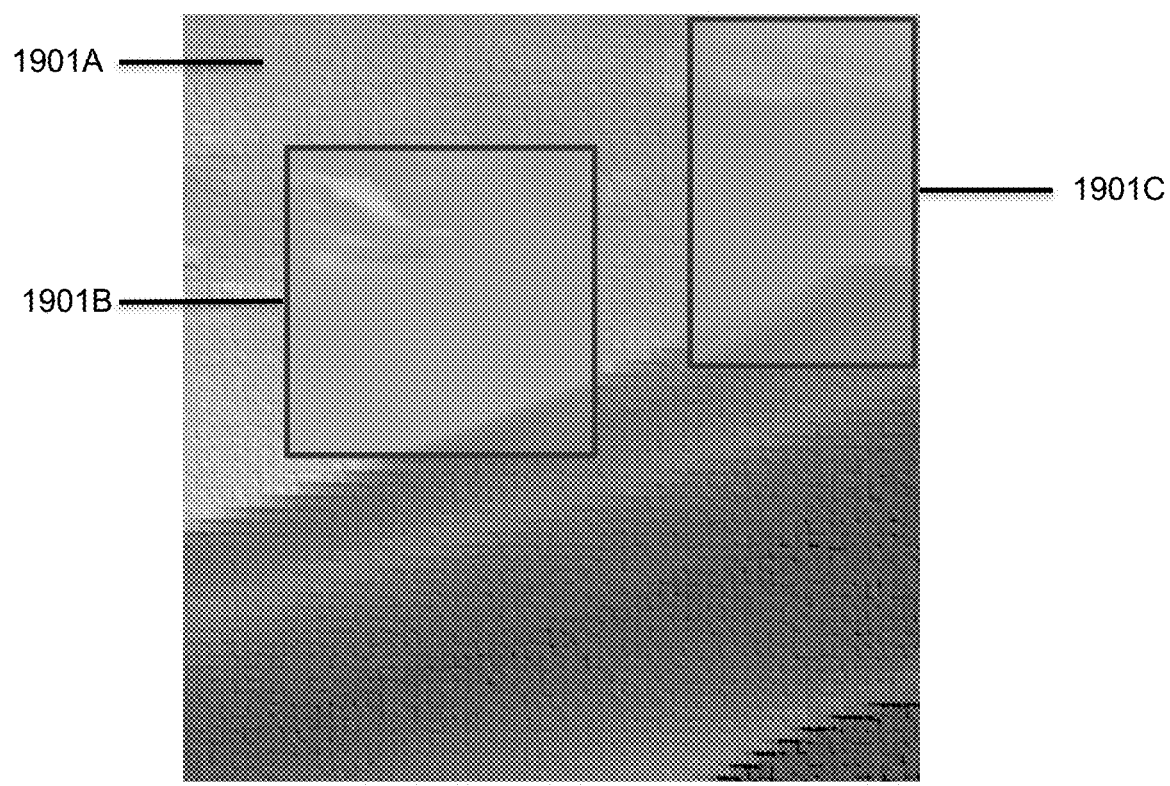
FIG. 19B illustrates that only the first portion of the image in FIG. 19A and that the second portion of the image in FIG. 19A are high resolution and the remainder of the image is lower resolution.

FIG. 19A illustrates a large field of view wherein a first user is looking at a first portion of the image and a second user is looking at a second portion of the image. 1900A is the large field of view, which is of a first resolution. 1900B is the location where a first user is looking which is set to become high resolution, as shown in FIG. 19B. 1900C is the location where a second user is looking which is set to become high resolution, as shown in FIG. 19B.

FIG. 19B illustrates that only the first portion of the image in FIG. 19A and that the second portion of the image in FIG. 19A are high resolution and the remainder of the image is low resolution. 1900A is the large field of view, which is of a first resolution (low resolution). 1900B is the location of the high resolution zone of a first user, which is of a second resolution (high resolution in this example). 1900C is the location of the high resolution zone of a second user, which is of a second resolution (high resolution in this example). Thus, a first high resolution zone be used for a first user. And, a second high resolution zone can be used for a second user. This system could be useful for the home theater display as shown in FIGS. 14A and 14B.

Figure 20A:
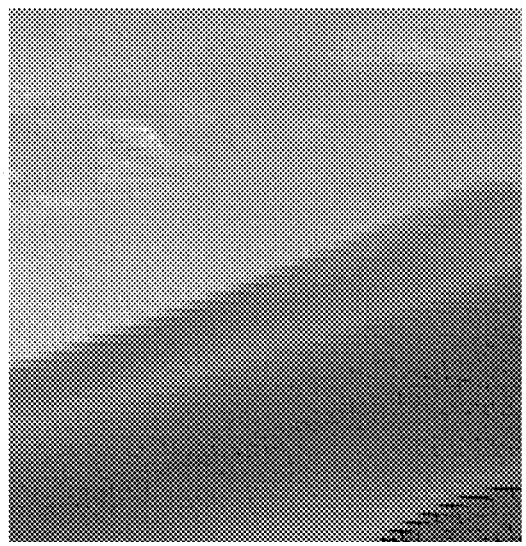
FIG. 20A illustrates a low resolution image.

FIG. 20A illustrates a low resolution image.

Figure 20B:
FIG. 20B illustrates a high resolution image.

FIG. 20B illustrates a high resolution image.

Figure 20C:
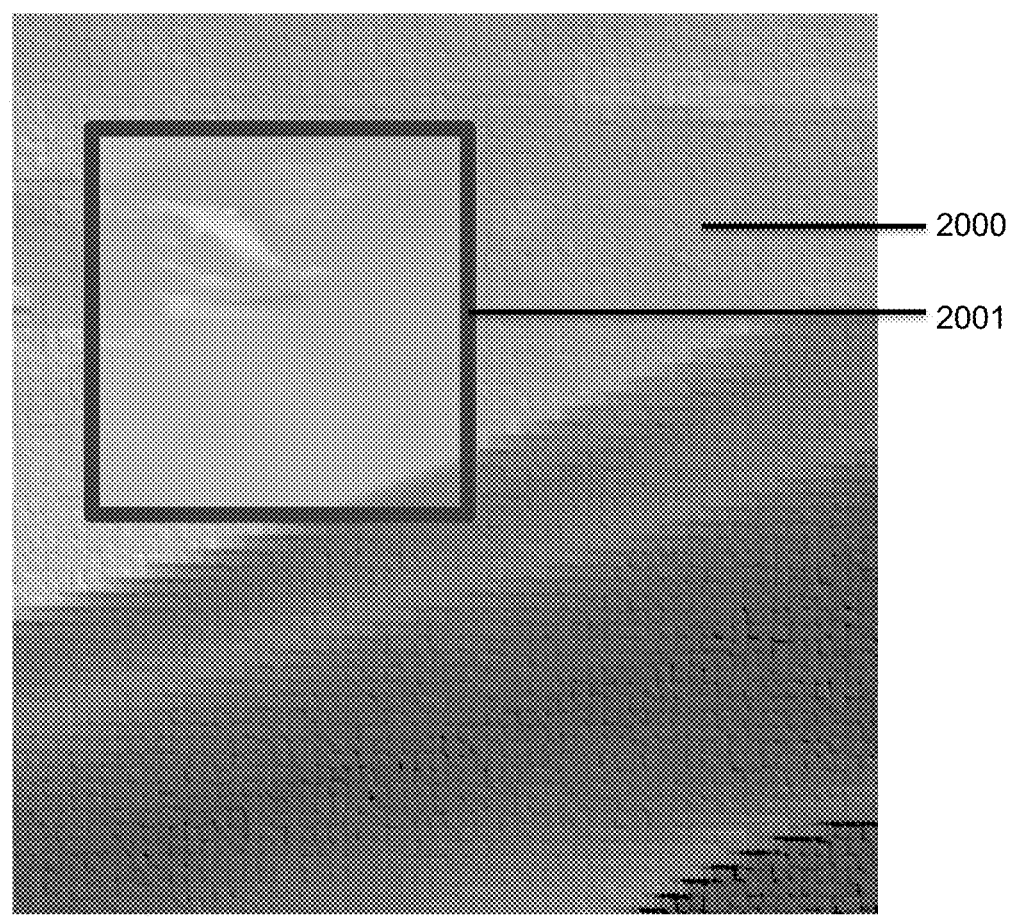
FIG. 20C illustrates a composite image.

FIG. 20C illustrates a composite image. Note that this composite image has a first portion 2000 that is of low resolution and a second portion 2001 that is of high resolution. This was described in U.S. patent Ser. No. 16/893,291, which is incorporated by reference in its entirety. The first portion is determined by the user's viewing parameter (e.g., viewing angle). A point of novelty is near-real time streaming of the first portion 2000 with the first image quality and the second portion with the second image quality. Note that the first portion could be displayed differently from the second portion. For example, the first portion and second portion could differ in visual presentation parameters including: brightness; color scheme; or other. Thus, in some embodiments, a first portion of the image can be compressed and a second portion of the image is not compressed. In other embodiments, a composite image is generated with the arranging of some high resolution images and some low resolution images stitched together for display to a user. In some embodiments, some portions of a large (e.g., 429 million pixel) image are high resolution and some portions of the large image are low resolution. The portions of the large image that are high resolution will be streamed in accordance with the user's viewing parameters (e.g., convergence point, viewing angle, head angle, etc.).

Figure 21:
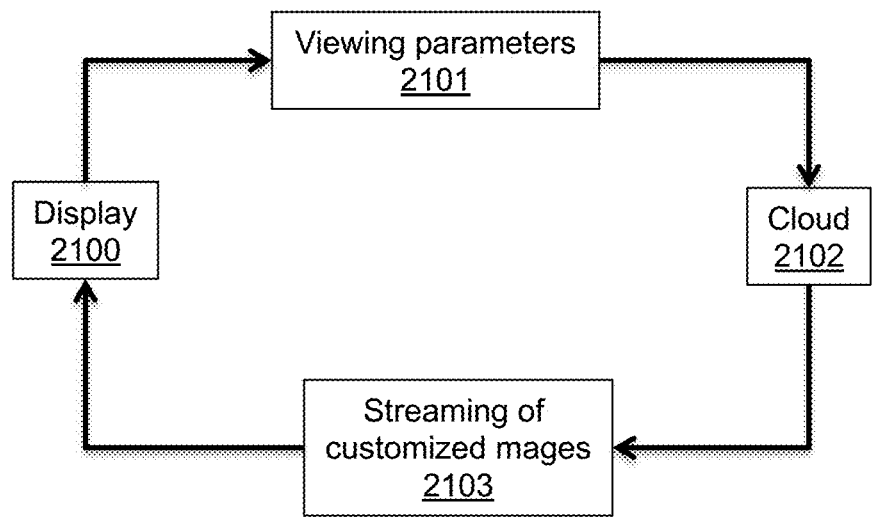
FIG. 21 illustrates a method and a process for performing near-real-time streaming of customized images.

FIG. 21 illustrates a method and a process for performing near-real-time streaming of customized images.

With respect to the display 2100, the displays include, but are not limited to the following: a large TV; an extended reality (e.g., Augmented Reality, Virtual Reality, or Mixed Reality display); a projector system on a screen; a computer monitor, or the like. A key component of the display is the ability to track where in the image a user is looking and what the viewing parameters are.

With respect to the viewing parameters 2101, the viewing parameters include, but are not limited to the following: viewing angle; vergence/convergence; user preferences (e.g., objects of particular interest, filtering—some objects rated "R" can be filtered for a particular user, etc.).

With respect to the cloud 1202, each frame in the movie or video would be of extremely large data (especially if the home theater shown in FIGS. 14A and 14B is used in combination with the camera cluster as described in U.S. patent application Ser. No. 17/225,610, which is incorporated by reference in its entirety. Note that the cloud refers to storage, databases, etc. Note that the cloud is capable of cloud computing. A point of novelty in this patent is the sending of the viewing parameters of user(s) to the cloud, processing of the viewing parameters in the cloud (e.g., selecting a field of view or composite stereoscopic image pair as discussed in FIG. 12) and determining which portions of extremely large data to stream to optimize the individual user's experience. For example, multiple users could have their movie synchronized. Each would stream 2103 from the cloud their individually optimized data for that particular time point onto their mobile device. And, each would then view their individually optimized data on their device. This would result in an improved immersive viewing experience. For example, suppose at a single time point, there was a dinner scene with a chandelier, a dog, an old man, a book case, a long table, a carpet and wall art. A user named Dave could be looking at the dog and Dave's images would be optimized (e.g., images with maximum resolution and optimized color of the dog are streamed to Dave's mobile device and displayed on Dave's HDU). A user named Kathy could be looking at the chandelier and Kathy's images would be optimized (e.g., images with maximum resolution and optimized color of the chandelier are streamed to Kathy's mobile device and displayed on Kathy's HDU). Finally, a user named Bob could be looking at the old man and Bob's images would be optimized (e.g., images with maximum resolution and optimized color of the old man are streamed to Bob's mobile device and displayed on Bob's HDU). It should be noted that the cloud would stored a tremendous dataset at each time point, but only portions of it would be streamed and those portions are determined by the user's viewing parameters and/or preferences. So, the book case, long table, carpet and wall art may all be within the field of view for Dave, Kathy and Bob, but these objects would not be optimized for display (e.g., the highest possible resolution of these images stored in the cloud was not streamed).

Finally, the concept of pre-emptive is introduced. If it is predicted that an upcoming scene is may cause a specific user viewing parameter to change (e.g., user head turn), then pre-emptively streaming of that additional image frames can be performed. For example, if the time of a movie is at 1:43:05 and a dinosaur is going to make a noise and pop out from the left side of the screen at 1:43:30. Thus, the whole scene could be downloaded in a low resolution format and additional sets of data of selective portions of the FOV could be downloaded as needed (e.g., based on user's viewing parameter, based on upcoming dinosaur scene where user is predicted to look). Thus, the dinosaur popping out will always be in its maximum resolution. Such technique creates a more immersive and improved viewing experience.

Figure 22A:
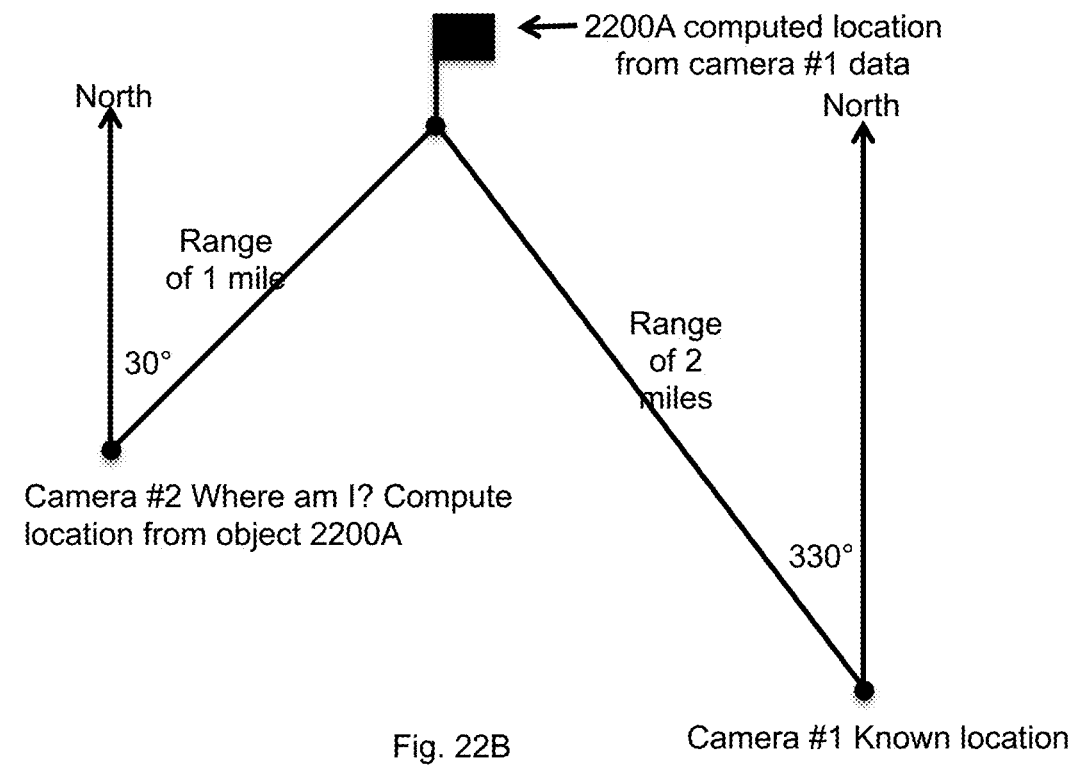
FIG. 22A illustrates using resection in conjunction with stereoscopic cameras wherein a first camera location is unknown.
Figure 22B:
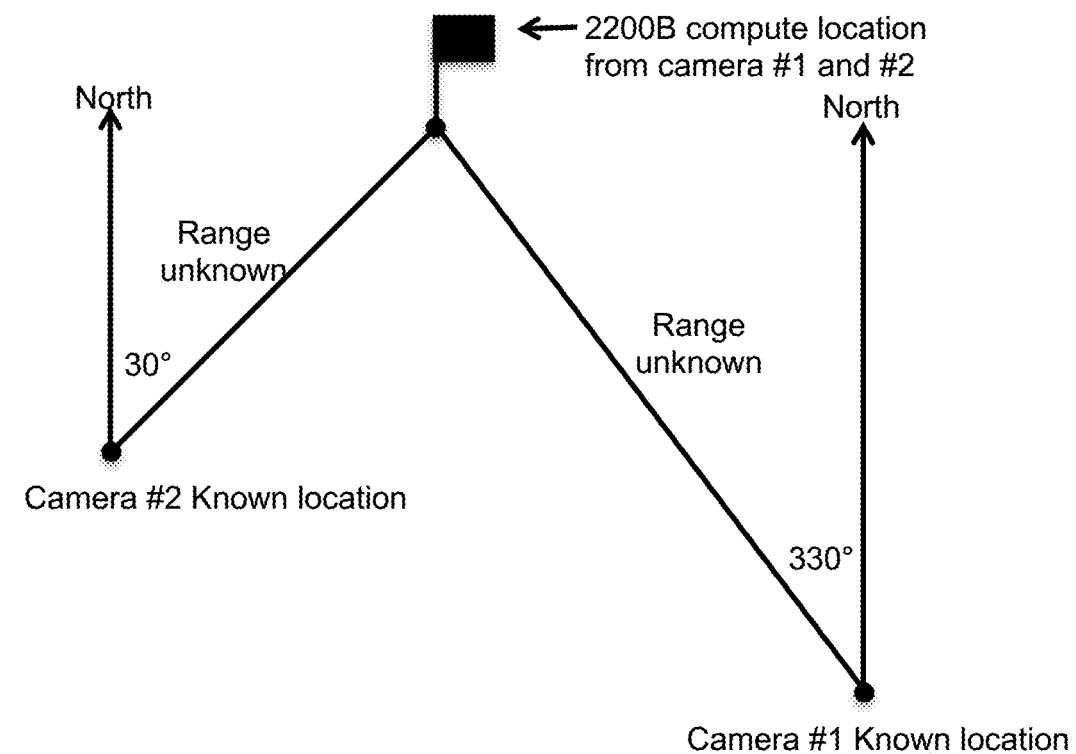
FIG. 22B illustrates using resection in conjunction with stereoscopic cameras wherein an object location is unknown.

FIG. 22A illustrates using resection in conjunction with stereoscopic cameras. Camera #1 has a known location (e.g., latitude and longitude from a GPS). From Camera #1, a range (2 miles) and direction (330° North North West) to an object 2200 is known. The location of the object 2200 can be computed. Camera #2 has an unknown location, but the range (1 mile) and direction (30° North Northeast) to the object 2200 is known. Since the object 2200's location can be computed, the geometry can be solved and the location of camera #2 determined.

FIG. 22A illustrates using resection in conjunction with stereoscopic cameras. Camera #1 has a known location (e.g., latitude and longitude from a GPS). Camera #1 and Camera #2 have known locations. From Camera #1, a direction (330° North Northwest) to an object 2200B is known. From Camera #2, a direction (30° North Northeast) to an object 2200B is known. The location of the object 2200B can be computed.

FIG. 23A illustrates a top down view of a person looking forward to the center of the screen of the home theater. The person 2300 is looking forward toward the center section 2302B of the screen 2301 of the home theater. During this time point, the streaming is customized to have the center section 2302B optimized (e.g., highest possible resolution), the left section 2302A non-optimized (e.g., low resolution or black), and the right section 2302C non-optimized (e.g., low resolution or black). Note that a monitoring system (to detect user's viewing direction and other viewing parameters, such as gesture or facial expression) or a controller (to receive commands from the user must also be in place) to be inputted for the appropriate streaming.

FIG. 23B illustrates a top down view of a person looking forward to the right side of the screen of the home theater. The person 2300 is looking toward the right side of section 2302C of the screen 2301 of the home theater. During this time point, the streaming is customized to have the right section 2302C optimized (e.g., highest possible resolution), the left section 2302A non-optimized (e.g., low resolution or black), and the center section 2302B non-optimized (e.g., low resolution or black). Note that a monitoring system (to detect user's viewing direction and other viewing parameters, such as gesture or facial expression) or a controller (to receive commands from the user must also be in place) to be inputted for the appropriate streaming.

Figure 24:
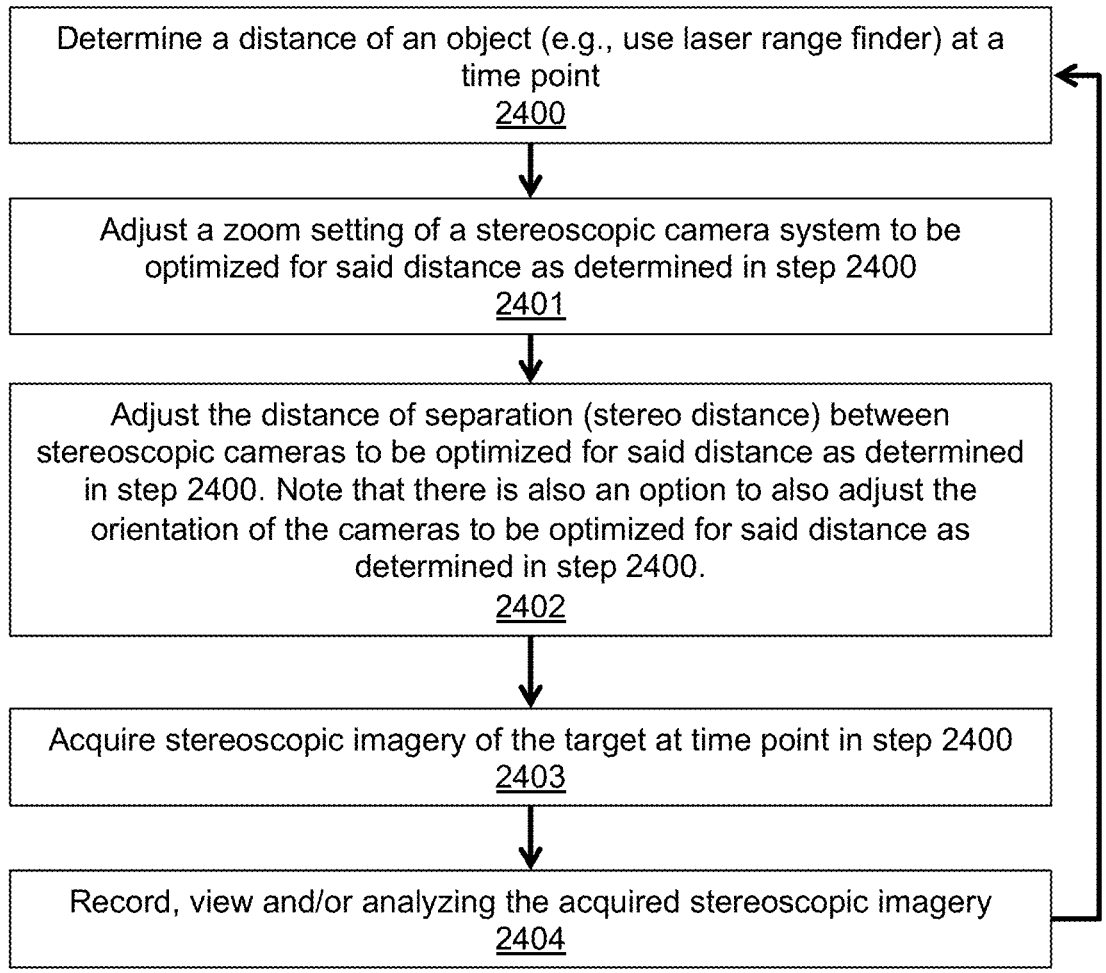
FIG. 24 illustrates a method, system and apparatus for optimizing stereoscopic camera settings during image acquisition during movement.

FIG. 24 illustrates a method, system and apparatus for optimizing stereoscopic camera settings during image acquisition during movement. 2400 illustrates determining a distance of an object (e.g., use laser range finder) at a time point. An object tracking/target tracking system can be implemented. 2401 illustrates adjusting a zoom setting of a stereoscopic camera system to be optimized for said distance as determined in step 2400. In the preferred embodiment, this would be performed when using a zoom lens, as opposed to performing digital zooming. 2402 illustrates adjusting the distance of separation (stereo distance) between stereoscopic cameras to be optimized for said distance as determined in step 2400. Note that there is also an option to also adjust the orientation of the cameras to be optimized for said distance as determined in step 2400. 2403 illustrates acquiring stereoscopic imagery of the target at time point in step 2400. 2404 illustrates recording, view and/or analyzing the acquired stereoscopic imagery.

What is claimed is:
1. A method comprising:
uploading via an internet a user's viewing parameter to a cloud
wherein said cloud stores imagery,
wherein said imagery is obtained from a camera system,
wherein said camera system has an orientation,
wherein said camera system is not located on a head display unit worn by said user,
wherein said cloud is capable of cloud computing, and
wherein said user's viewing parameter comprises a viewing angle,
wherein said viewing angle is determined based on said user's use of said head display unit,
wherein said head display unit has an orientation, and
wherein said head display unit's orientation is different from said camera system's orientation;
in said cloud, optimizing user-specific display imagery from said imagery
wherein said user-specific display imagery is based on at least said viewing parameter,
wherein said user-specific display imagery comprises a first portion and a second portion,
wherein said first portion of said user-specific display imagery is different from said second portion of said user-specific display imagery,
wherein said first portion of said user-specific display imagery comprises a first image quality,
wherein said first portion of said user-specific display imagery corresponds to said viewing angle,
wherein said second portion of said user-specific display imagery does not correspond to said viewing angle,
wherein said second portion of said user-specific display imagery comprises a second image quality, and wherein said second image quality is lower than said first image quality;
downloading via the internet said user-specific display imagery; and
displaying said user-specific display imagery to said user.

2. The method of claim 1 further comprises:
wherein said user-specific display imagery comprises a first portion with a first spatial resolution and a second portion with a second spatial resolution, and
wherein said first spatial resolution is higher than said second spatial resolution.

3. The method of claim 1 further comprises:
wherein said imagery comprises video imagery, and
wherein each frame of said video imagery is divided into said first portion and said second portion.

4. The method of claim 1 further comprises:
wherein said user-specific display imagery comprises wherein said first portion comprises a first zoom setting and wherein said second portion comprises a second zoom setting, and
wherein said first zoom setting is higher than said second zoom setting.

5. The method of claim 4 further comprises wherein said first portion is determined by at least one of the group consisting of:
a position of said user's body;
an orientation of said user's body;
a gesture of said user's hand;
a facial expression of said user;
a position of said user's head; and
an orientation of said user's head.

6. The method of claim 4 further comprises wherein said first portion is determined by a graphical user interface.

7. The method of claim 1 further comprising:
wherein said imagery comprises a first field of view (FOV),
wherein said user-specific display imagery comprises a second FOV, and
wherein said first FOV is larger than said second FOV.

8. The method of claim 1 further comprising:
wherein said imagery comprises stereoscopic imagery; and
wherein said stereoscopic imagery is obtained via stereoscopic cameras or stereoscopic camera clusters.

9. The method of claim 1 further comprising wherein said imagery comprises stitched imagery wherein said stitched imagery is generated by at least two cameras.

10. The method of claim 1 further comprising:
wherein said imagery comprises composite imagery,
wherein said composite imagery is generated by:
taking a first image of a scene with a first set of camera settings wherein said first set of camera settings causes a first object to be in focus and a second object to be out of focus; and
taking a second image of a scene with a second set of camera settings wherein said second set of camera settings causes said second object to be in focus and said first object to be out of focus.

11. The method of claim 10 further comprises wherein:
when said user looks at said first object, said first image would be presented to said user; and
when said user looks at said second object, said second image would be presented to said user.

12. The method of claim 10 further comprising combining at least said first object from said first image and said second object from said second image into said composite image.

13. The method of claim 1 further comprises wherein said viewing angle is movable by said user.

14. The method of claim 1 further comprises wherein said viewing parameter comprises convergence.

15. The method of claim 1 further comprising:
wherein said user-specific display imagery is 3D imagery, and
wherein said 3D imagery is presented on said head display unit (HDU).

16. The method of claim 15 further comprising wherein said viewing angle is determined by an orientation of said HDU.

17. A method comprising:
determining a user's viewing parameter
wherein said user's viewing parameter comprises a viewing angle,
wherein said viewing angle is determined based on said user's head orientation, and
wherein a head display unit (HDU) determines said user's head orientation;
sending via an internet said user's viewing parameter to a cloud wherein said cloud is capable of cloud computing,
wherein said imagery is obtained from a camera system,
wherein said camera system has an orientation,
wherein said head display unit's orientation is different from said camera system's orientation,
wherein said camera system is not located on said HDU worn by said user,
wherein said cloud computing generates user-specific display imagery from imagery stored on said cloud,
wherein said user-specific display imagery is based on at least said user's viewing parameter,
wherein said user-specific display imagery comprises a first portion and a second portion,
wherein said first portion of said user-specific display imagery is different from said second portion of said user-specific display imagery,
wherein said first portion of said user-specific display imagery comprises a first image quality,
wherein said first portion of said user-specific display imagery corresponds to said viewing angle,
wherein said second portion of said user-specific display imagery does not correspond to said viewing angle,
wherein said second portion of said user-specific display imagery comprises a second image quality, and
wherein said second image quality is lower than said first image quality;
receiving via said internet said user-specific display imagery; and
displaying said user-specific display imagery on said HDU wherein said HDU comprises a left eye display and a right eye display.

18. The method of claim 1 further comprising wherein said user-specific display imagery is presented to said user on a display wherein said user has at least a $0.5\pi$ steradian field of view.

19. The method of claim 17 further comprising wherein said camera system comprises a stereoscopic camera system.

20. A method comprising:
receiving via an internet a user's viewing parameter at a cloud
wherein said user's viewing parameter comprises a viewing angle, wherein said viewing angle is determined based on said user's look angle,
wherein an eye tracking system of a head display unit (HDU) determines an orientation of said user's look angle, and
wherein said cloud is capable of cloud computing,
using cloud computing to generate user-specific display imagery from imagery stored on said cloud,
wherein said imagery is obtained from a camera system,
wherein said camera system has an orientation,
wherein said orientation of said user's look angle is different from said camera system's orientation,
wherein said camera system is not located on said HDU worn by said user,
wherein said user-specific display imagery is based on at least said user's viewing parameter,
wherein said user-specific display imagery comprises a first portion and a second portion,
wherein said first portion of said user-specific display imagery is different from said second portion of said user-specific display imagery,
wherein said first portion of said user-specific display imagery comprises a first image quality,
wherein said first portion of said user-specific display imagery corresponds to said viewing angle,
wherein said second portion of said user-specific display imagery does not correspond to said viewing angle,
wherein said second portion of said user-specific display imagery comprises a second image quality, and
wherein said second image quality is lower than said first image quality;
sending via said internet said user-specific display imagery to said HDU
wherein said HDU comprises a left eye display and a right eye display,
wherein said HDU displays said user-specific display imagery.

* * * * *